(12) United States Patent
Zeng et al.

(10) Patent No.: US 12,508,311 B2
(45) Date of Patent: Dec. 30, 2025

(54) FUSION PROTEIN, AND PREPARATION METHOD AND USE THEREOF

(71) Applicants: SUN YAT-SEN UNIVERSITY, Guangdong (CN); SUN YAT-SEN UNIVERSITY CANCER CENTER (SYSUCC), Guangdong (CN)

(72) Inventors: Musheng Zeng, Guangdong (CN); Jie Yang, Guangdong (CN); Guokai Feng, Guangdong (CN); Qiaoli Wang, Guangdong (CN)

(73) Assignees: SUN YAT-SEN UNIVERSITY, Guangdong (CN); SUN YAT-SEN UNIVERSITY CANCER CENTER (SYSUCC), Guangdong (CN)

( * ) Notice: Subject to any disclaimer, the term of this patent is extended or adjusted under 35 U.S.C. 154(b) by 941 days.

(21) Appl. No.: 17/766,450

(22) PCT Filed: May 18, 2021

(86) PCT No.: PCT/CN2021/094237
§ 371 (c)(1),
(2) Date: Apr. 4, 2022

(87) PCT Pub. No.: WO2022/217691
PCT Pub. Date: Oct. 20, 2022

(65) Prior Publication Data
US 2024/0058441 A1    Feb. 22, 2024

(30) Foreign Application Priority Data
Apr. 14, 2021   (CN) .......................... 202110398255.8

(51) Int. Cl.
| | |
|---|---|
| *A61K 39/395* | (2006.01) |
| *A61K 31/5377* | (2006.01) |
| *A61K 38/46* | (2006.01) |
| *A61P 35/00* | (2006.01) |
| *C07K 16/40* | (2006.01) |
| *C12N 9/64* | (2006.01) |

(52) U.S. Cl.
CPC ...... *A61K 39/3955* (2013.01); *A61K 31/5377* (2013.01); *A61K 38/46* (2013.01); *A61P 35/00* (2018.01); *C07K 16/40* (2013.01); *C12N 9/6424* (2013.01); *C12Y 304/21* (2013.01); *C07K 2317/569* (2013.01); *C07K 2319/33* (2013.01)

(58) Field of Classification Search
None
See application file for complete search history.

(56) References Cited

U.S. PATENT DOCUMENTS

2024/0058551 A1\*   2/2024   Smith ................... A61M 15/08

FOREIGN PATENT DOCUMENTS

| CN | 104131034 A | 11/2014 |
|---|---|---|
| CN | 104797603 A | 7/2015 |
| CN | 106852148 A | 6/2017 |
| WO | 2019005822 A1 | 1/2019 |

OTHER PUBLICATIONS

Ni et al., Mechanistic Insights into How the Single Point Mutation Change the Autoantibody Repertoire, The Protein Journal, 43, pp. 683-696, Jul. 2024 (Year: 2024).\*
Salamouni et al., Nanobody engineering: computational modelling and design for biomedical and therapeutic applications, FEBS Open Bio. 15 (2025), 236-253 (Year: 2025).\*
Dagogo-Jack et al. Tumour heterogeneity and resistance to cancer therapies, Nature Review Clinical Oncology, vol. 15, pp. 81-94, Feb. 2018 (Year: 2018).\*
Lim et al., A Cancer Specific Cell-Penetrating Peptide, BR2, for the Efficient Delivery of an scFv into Cancer Cells, PLOS ONE, vol. 8, Issue 6, e66084, Jun. 2013 (Year: 2013).\*
Kaiser, J., First pass at cancer genome reveals complex landscape, Science, 2006, 313:1370 (Year: 2006).\*
Targeted Cancer Therapies, retrieved from https://www.cancer.gov/about-cancer/treatment/types/targeted-therapies/targeted-therapies-fact-sheet, Sep. 1, 2021 (Year: 2021).\*
Ma et al., Ubiquitin-Independent, Proteasome-Mediated Targeted Degradation of KRAS in Pancreatic Adenocarcinoma Cells Using an Engineered Ornithine Decarboxylase/Antizyme Sys IUBMB Life, vol. 71, No. 1, pp. 57-65 Publication Date: Oct. 22, 2018 (Year: 2018).\*

(Continued)

*Primary Examiner* — Peter J Reddig
*Assistant Examiner* — Cheng Lu
(74) *Attorney, Agent, or Firm* — D'Ambrosio & Menon, PLLC; Usha Menon

(57) ABSTRACT

Disclosed are a fusion protein, and a preparation method and use thereof, which belong to the field of biomedicine technologies. The fusion protein comprises a polypeptide specifically bound to a KRas protein, a specific tumor-cell-penetrating peptide and a lysosome recognition peptide. The fusion protein with tumor targeting, penetrability and specific protein degradation is designed and constructed direct to an undruggable protein for the first time, thus providing a new idea for development of an anti-cancer targeted drug. Different from the prior art in which one molecule can only target one target protein, the fusion protein can simultaneously induce degradation of wild-type and mutant-type KRas proteins. Meanwhile, the fusion protein can improve the sensitivity of the KRas mutant-type tumor to the tumor-targeted drug by inducing degradation of KRas, thus expanding an application range of existing anti-cancer targeted drugs and having important significance in tumor clinic treatment.

15 Claims, 23 Drawing Sheets

Specification includes a Sequence Listing.

(56) References Cited

OTHER PUBLICATIONS

Ma, Yihui et al. "A preliminary study on targeted degradation of KRAS oncoprotein by using a ubiquitin-independent, proteasome-mediated degradation pathway ODC/AZ;" Chin J Clin Oncol 2016. vol. 43. No. 21, Nov. 15, 2016 (Nov. 15, 2016).

Melchionna, Teresa et al. "A Protein Silencing Switch by Ligand-induced Proteasome-targeting Intrabodies;" J. Mol. Bio. vol. 3. No. 374, Sep. 22, 2007 (Sep. 22, 2007) pp. 641-654.

Misale, S., Yaeger, R., Hobor, S. et al. Emergence of KRAS mutations and acquired resistance to anti-EGFR therapy in colorectal cancer. Nature 486, 532-536 (2012).

CNIPA first office action of co-pending related Chinese application No. 2021103982558 dated Feb. 22, 2025.

CNIPA first search of co-pending related Chinese application No. 2021103982558 dated Feb. 18, 2025.

\* cited by examiner

SEQUENCE LISTING

<160> NUMBER OF SEQ ID NOS: 7

<210> SEQ ID NO 1
<211> LENGTH: 126
<212> TYPE: PRT
<213> ORGANISM: Artificial Sequence
<220> FEATURE:
<223> OTHER INFORMATION: synthesized

<400> SEQUENCE: 1

Asp Val Gln Leu Gln Glu Ser Gly Gly Gly Leu Val Gln Ala Gly Gly
1               5                   10                  15

Ser Leu Arg Leu Ser Cys Val Ala Ser Gly Arg Thr Phe Ser Thr Tyr
            20                  25                  30

Pro Thr Gly Trp Phe Arg Gln Ala Pro Gly Lys Glu Arg Glu Phe Val
        35                  40                  45

Ala Arg Ile Asn Leu Ser Gly Gly Ile Thr Asn Tyr Ala Asp Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Gly Gly Gly Ser Thr Thr Trp Ala Gly Gly Ile Pro Thr Asn Phe Asp
            100                 105                 110

Tyr Trp Gly Gln Gly Thr Gln Val Thr Val Ser Ser Gly Arg
        115                 120                 125

<210> SEQ ID NO 2
<211> LENGTH: 17
<212> TYPE: PRT
<213> ORGANISM: Artificial Sequence
<220> FEATURE:
<223> OTHER INFORMATION: synthesized

<400> SEQUENCE: 2

Arg Ala Gly Leu Gln Phe Pro Val Gly Arg Leu Leu Arg Arg Leu Leu
1               5                   10                  15

Arg

<210> SEQ ID NO 3
<211> LENGTH: 14
<212> TYPE: PRT
<213> ORGANISM: Artificial Sequence
<220> FEATURE:
<223> OTHER INFORMATION: synthesized

<400> SEQUENCE: 3

Lys Phe Glu Arg Gln Lys Ile Leu Asp Gln Arg Phe Phe Glu
1               5                   10

<210> SEQ ID NO 4
<211> LENGTH: 157
<212> TYPE: PRT
<213> ORGANISM: Artificial Sequence
<220> FEATURE:
<223> OTHER INFORMATION: synthesized

<400> SEQUENCE: 4

Arg Ala Gly Leu Gln Phe Pro Val Gly Arg Leu Leu Arg Arg Leu Leu
1               5                   10                  15

Arg Asp Val Gln Leu Gln Glu Ser Gly Gly Gly Leu Val Gln Ala Gly
            20                  25                  30

Gly Ser Leu Arg Leu Ser Cys Val Ala Ser Gly Arg Thr Phe Ser Thr
            35                  40                  45

Tyr Pro Thr Gly Trp Phe Arg Gln Ala Pro Gly Lys Glu Arg Glu Phe
        50                  55                  60

Val Ala Arg Ile Asn Leu Ser Gly Gly Ile Thr Asn Tyr Ala Asp Ser
65                  70                  75                  80

Val Lys Gly Arg Phe Thr Ile Ser Arg Asp Asn Ala Lys Asn Thr Val
                85                  90                  95

Tyr Leu Gln Met Asn Ser Leu Lys Pro Glu Asp Thr Ala Val Tyr Tyr
            100                 105                 110

Cys Gly Gly Gly Ser Thr Thr Trp Ala Gly Gly Ile Pro Thr Asn Phe
            115                 120                 125

Asp Tyr Trp Gly Gln Gly Thr Gln Val Thr Val Ser Ser Gly Arg Lys
            130                 135                 140

Phe Glu Arg Gln Lys Ile Leu Asp Gln Arg Phe Phe Glu
145                 150                 155

<210> SEQ ID NO 5
<211> LENGTH: 157
<212> TYPE: PRT
<213> ORGANISM: Artificial Sequence
<220> FEATURE:
<223> OTHER INFORMATION: synthesized

<400> SEQUENCE: 5

Arg Ala Gly Leu Gln Phe Pro Val Gly Arg Leu Leu Arg Arg Leu Leu
1               5                   10                  15

Arg Asp Val Gln Leu Gln Glu Ser Gly Gly Leu Val Gln Ala Gly
            20                  25                  30

Gly Ser Leu Arg Leu Ser Cys Val Ala Ser Gly Arg Thr Phe Ser Thr
            35                  40                  45

Tyr Pro Thr Gly Trp Phe Arg Gln Ala Pro Gly Lys Glu Arg Glu Phe
        50                  55                  60

Val Ala Arg Ile Asn Leu Ser Gly Gly Ile Thr Asn Tyr Ala Asp Ser
65                  70                  75                  80

Val Lys Gly Arg Phe Thr Ile Ser Arg Asp Asn Ala Lys Asn Thr Val
                85                  90                  95

Tyr Leu Gln Met Asn Ser Leu Lys Pro Glu Asp Thr Ala Val Tyr Tyr
            100                 105                 110

Cys Gly Gly Gly Ser Thr Thr Trp Ala Gly Gly Ile Pro Thr Asn Phe
            115                 120                 125

Asp Tyr Trp Gly Gln Gly Thr Gln Val Thr Val Ser Ser Gly Arg Lys
            130                 135                 140

Phe Glu Arg Ala Lys Ile Leu Asp Ala Arg Phe Phe Glu
145                 150                 155

<210> SEQ ID NO 6
<211> LENGTH: 14
<212> TYPE: PRT
<213> ORGANISM: Artificial Sequence
<220> FEATURE:
<223> OTHER INFORMATION: synthesized

<400> SEQUENCE: 6

Lys Phe Glu Arg Ala Lys Ile Leu Asp Ala Arg Phe Phe Glu
1               5                   10

```
<210> SEQ ID NO 7
<211> LENGTH: 189
<212> TYPE: PRT
<213> ORGANISM: Artificial Sequence
<220> FEATURE:
<223> OTHER INFORMATION: synthesized

<400> SEQUENCE: 7

Met Thr Glu Tyr Lys Leu Val Val Gly Ala Gly Val Gly Lys
1               5                   10                  15

Ser Ala Leu Thr Ile Gln Leu Ile Gln Asn His Phe Val Asp Glu Tyr
                20                  25                  30

Asp Pro Thr Ile Glu Asp Ser Tyr Arg Lys Gln Val Val Ile Asp Gly
            35                  40                  45

Glu Thr Cys Leu Leu Asp Ile Leu Asp Thr Ala Gly Gln Glu Glu Tyr
    50                  55                  60

Ser Ala Met Arg Asp Gln Tyr Met Arg Thr Gly Glu Gly Phe Leu Cys
65                  70                  75                  80

Val Phe Ala Ile Asn Asn Thr Lys Ser Phe Glu Asp Ile His His Tyr
                85                  90                  95

Arg Glu Gln Ile Lys Arg Val Lys Asp Ser Glu Asp Val Pro Met Val
                100                 105                 110

Leu Val Gly Asn Lys Cys Asp Leu Pro Ser Arg Thr Val Asp Thr Lys
            115                 120                 125

Gln Ala Gln Asp Leu Ala Arg Ser Tyr Gly Ile Pro Phe Ile Glu Thr
    130                 135                 140

Ser Ala Lys Thr Arg Gln Arg Val Glu Asp Ala Phe Tyr Thr Leu Val
145                 150                 155                 160

Arg Glu Ile Arg Gln Tyr Arg Leu Lys Lys Ile Ser Lys Glu Glu Lys
                165                 170                 175

Thr Pro Gly Cys Val Lys Ile Lys Lys Cys Ile Ile Met
            180                 185
```

FUSION PROTEIN, AND PREPARATION METHOD AND USE THEREOF

CROSS-REFERENCE TO RELATED APPLICATIONS

The present application is a national phase entry under 35 USC § 371 of International Application PCT/CN2021/094237, filed May 18, 2021, which claims the benefit of and priority to Chinese Patent Application No. 2021103982558, filed Apr. 14, 2021, the entire disclosures of which are incorporated herein by reference.

INCORPORATION BY REFERENCE

This application includes a sequence listing in computer readable form (a "txt" file) that is submitted herewith on ASCII text file named Sequence Listing.txt, created on Apr. 4, 2022 and 6,751 bytes in size. This sequence listing is incorporated by reference herein.

TECHNICAL FIELD

The present disclosure belongs to the field of biomedicine technology, and more particularly, relates to a fusion protein, and a preparation method and use thereof.

BACKGROUND

KRas, as a member of GTP protease superfamily, plays an important role in promoting the occurrence and development of multiple tumors, such as proliferation, metastasis and angiogenesis. Therefore, KRas is a well-known cancer-promoting factor. Studies have shown that KRas mutations exist in various types of cancers, wherein the proportion of KRas mutations in colorectal cancer cells is as high as 37.9%. Common KRas mutations are mainly found on codons 12, 13, 61 and 146 in exon 2, wherein the mutations found at codons 12 and 13 account for 90% of total mutations. The high mutation rate leads to the continuous activation of multiple tumor deterioration signal pathways downstream the KRas. These activated physiological processes can weaken or even offset effects of signal molecules upstream the KRas such as an epidermal growth factor receptor (EGFR) inhibitor, resulting in natural tolerance of colorectal cancer cells to various current first-line anti-cancer targeted drugs.

In life sciences and basic medicine, reducing the activation or expression level of protein is an important strategy for studying the protein function and designing the targeted drug. At present, the inhibition of the protein activity mainly aims at the development of the small molecule inhibitor for the active site of the target protein. However, studies have shown that 85% of proteins, including KRas protein, are "undruggable proteins". It is difficult to develop inhibitors for such proteins due to its loose and changeable structure, strong competitive binding capacity of other small molecules in cells, and easy mutation of active site. In addition, blocking coverage of the active site of the target protein by using an antibody is also a method for inhibiting the protein activity. However, the characteristics of the large molecular weight of the conventional antibody, difficulty in entering the cell membrane, and the requirement of antibody screening for the specific fragment of the target protein limit the use of the antibody, resulting in that the activity of only a few membrane proteins can be inhibited by such method.

In addition to the activation level, the inhibition of the expression level of the protein is also an important means to weaken the protein function. The DNA editing technology represented by Crispr and the RNA interference technology represented by siRNA can reduce the expression of target genes at DNA and RNA levels respectively, thus reducing the content of the encoded protein in cells, and then inhibiting the protein function. At present, DNA editing and RNA interference have been widely used in basic research of life sciences, and the use of these two technologies in clinic treatment have also been explored by some researchers. However, in practical application, it is found that both of DNA editing and RNA interference have an off-target effect, and long action time makes cells easily produce a compensatory effect, which causes a trouble for basic research. In addition, a strict working condition also limits the clinic application of these two technologies, resulting in that no drug based on DNA editing and RNA interference is approved for clinic treatment of diseases.

In addition to the DNA and RNA levels, reducing the accumulation of the protein in cells at the protein level is also an important strategy to weaken protein expression, wherein protein degradation is an important method to reduce the accumulation of the protein in cells. The protein degradation in living cells is a rapid and orderly physiological process, which mainly occurs in two organelles including proteasome and lysosome. At present, the study on protein targeting degradation mainly focuses on the proteasome, which induces the ubiquitin ligase (E3) to bind to the target protein, then transfers the ubiquitin molecule to the protein, making it recognized and degraded by the proteasome. The mainstream protein targeting degradation technology is to link the target protein and the E3 ligase together by constructing a chimeric molecule, thus promoting the degradation of the target protein. A typical representative technology is PROTAC (proteolysis targeting chimera). The PROTAC chimeric molecule consists of three parts: a target protein ligand, an E3 ligase ligand, and an intermediate fragment linking the two covalently. The target protein ligand is responsible for recognizing and binding the target protein, and the E3 ligand is responsible for binding the E3 ligase. It is reported that, there have been various proteins capable of being rapidly degraded by the PROTAC technology. PROTAC constructed by using the KRas G12C ligand MRTX849 can effectively induce the degradation of the KRas protein mutated in G12C. However, G12C mutation only accounts for a small part of KRas mutations (taking the colorectal cancer as an example, there is only 6.8% of G12C mutation), and no effective ligand is suitable for other mutation types. Therefore, the problem of "undruggable protein" is not essentially solved. In addition, the specificity of the KRas ligand cannot be guaranteed, which may result in binding the protein by mistake. The chimeric molecule is also complicated in synthesis, and cannot be produced on a large scale. Therefore, the KRas has not been produced and used in commercially up to now.

SUMMARY

An objective of a first aspect of the present disclosure is to provide a fusion protein.

An objective of a second aspect of the present disclosure is to provide a nucleic acid molecule encoding the fusion protein of the first aspect of the present disclosure.

An objective of a third aspect of the present disclosure is to provide a vector comprising the nucleic acid molecule of the second aspect of the present disclosure.

An objective of a fourth aspect of the present disclosure is to provide a host cell comprising the vector of the third aspect of the present disclosure.

An objective of a fifth aspect of the present disclosure is to provide a preparation method of the fusion protein of the first aspect of the present disclosure.

An objective of a sixth aspect of the present disclosure is to provide use of the fusion protein of the first aspect of the present disclosure in the preparation of a product.

An objective of a seventh aspect of the present disclosure is to provide a product comprising the fusion protein of the first aspect of the present disclosure.

An objective of an eighth aspect of the present disclosure is to provide a drug.

An objective of a ninth aspect of the present disclosure is to provide a combination drug.

In order to achieve the above objectives, the technical solutions used in the present disclosure are as follows.

In the first aspect of the present disclosure, a fusion protein is provided, which comprises a polypeptide specifically bound to a KRas protein, a specific tumor-cell-penetrating peptide and a lysosome recognition peptide.

Preferably, the polypeptide specifically bound to the KRas protein is an anti-KRas protein nanobody.

Further preferably, an amino acid sequence of the anti-KRas protein nanobody is:

a)
(SEQ ID NO. 1)
DVQLQESGGGLVQAGGSLRLSCVASGRTFSTYPTGWFRQA

PGKEREFVARINLSGGITNYADSVKGRFTISRDNAKNTVY

LQMNSLKPEDTAVYYCGGGSTTWAGGIPTNFDYWGQGTQV

TVSSGR;

or b) an amino acid sequence obtained by modifying the amino acid sequence shown in SEQ ID NO.1 by substituting, deleting or adding one or more amino acids and having a function same as or similar to that of the amino acid sequence shown in SEQ ID NO.1.

Preferably, the tumor comprises colorectal cancer, pancreatic cancer, renal cancer, lung cancer, liver cancer, breast cancer, prostate cancer, gastrointestinal cancer, peritoneal cancer, melanoma, endometrial cancer, ovarian cancer, cervical cancer, uterine cancer, bladder cancer, glioblastoma, brain metastasis, salivary gland cancer, thyroid cancer, brain cancer, lymphoma, myeloma, and head and neck cancer.

Preferably, the specific tumor-cell-penetrating peptide is ganglioside binding peptide.

Further preferably, an amino acid sequence of the ganglioside binding peptide is:

a)
(SEQ ID NO. 2)
RAGLQFPVGRLLRRLLR;

or b) an amino acid sequence obtained by modifying the amino acid sequence shown in SEQ ID NO.2 by substituting, deleting or adding one more or amino acids and having a function same as or similar to that of the amino acid sequence shown in SEQ ID NO.2.

Preferably, an amino acid sequence of the lysosome recognition peptide is:

a)
(SEQ ID NO. 3)
KFERQKILDQRFFE;

or b) an amino acid sequence obtained by modifying the amino acid sequence shown in SEQ ID NO.3 by substituting, deleting or adding one more or amino acids and having a function same as or similar to that of the amino acid sequence shown in SEQ ID NO.3.

Preferably, an amino acid sequence of the fusion protein is:

a)
(SEQ ID NO. 4)
RAGLQFPVGRLLRRLLRDVQLQESGGGLVQAGGSLRLSCV

ASGRTFSTYPTGWFRQAPGKEREFVARINLSGGITNYADS

VKGRFTISRDNAKNTVYLQMNSLKPEDTAVYYCGGGSTTW

AGGIPTNFDYWGQGTQVTVSSGRKFERQKILDQRFFE;

or b) an amino acid sequence obtained by modifying the amino acid sequence shown in SEQ ID NO.4 by substituting, deleting or adding one more or amino acids and having a function same as or similar to that of the amino acid sequence shown in SEQ ID NO.4.

In the second aspect of the present disclosure, a nucleic acid molecule encoding the fusion protein in the first aspect of the present disclosure is provided.

In the third aspect of the present disclosure, a vector is provided, which comprises the nucleic acid molecule in the second aspect of the present disclosure.

In the fourth aspect of the present disclosure, a host cell is provided, which comprises the vector in the third aspect of the present disclosure.

Preferably, the host cell comprises a prokaryotic cell and a eukaryotic cell.

In the fifth aspect of the present disclosure, a preparation method of the fusion protein in the first aspect of the present disclosure is provided, comprising the step of: culturing the host cell in the fourth aspect of the present disclosure to obtain the fusion protein.

In the sixth aspect of the present disclosure, use of the fusion protein in the first aspect of the present disclosure in the preparation of a product is provided.

Preferably, the product is any one selected from the group consisting of (1) to (3):

(1) a preparation for degrading a KRas protein;
(2) an anti-tumor drug; and
(3) a drug for improving a sensitivity of a KRas mutant-type tumor to a tumor-targeted drug.

Preferably, the KRas protein in (1) comprises a wild-type KRas protein and a mutant-type KRas protein.

Preferably, the mutant-type KRas protein comprises the KRas protein mutated at one or more amino acid positions of G12, G13, S17, P34, A59, Q61 and A146.

Preferably, the tumor in (2) is a KRas-related tumor, and is at least one selected from the group consisting of colorectal cancer, pancreatic cancer, renal cancer, lung cancer, liver cancer, breast cancer, prostate cancer, gastrointestinal cancer, peritoneal cancer, melanoma, endometrial cancer, ovarian cancer, cervical cancer, uterine cancer, bladder cancer, glioblastoma, brain metastasis, salivary gland cancer, thyroid cancer, brain cancer, lymphoma, myeloma, and head and neck cancer.

Preferably, the KRas mutant-type tumor in (3) is a tumor related to the mutant-type KRas protein.

Preferably, the mutant-type KRas protein is the KRas protein mutated at one or more amino acid positions of G12, G13, S17, P34, A59, Q61 and A146.

Preferably, the tumor-targeted drug is a human epidermal growth factor receptor (EGFR)-targeted drug.

In the seventh aspect of the present disclosure, a product is provided, which comprises the fusion protein in the first aspect of the present disclosure.

Preferably, the product is any one selected from the group consisting of (1) to (3):
  (1) a preparation for degrading a KRas protein;
  (2) an anti-tumor drug; and
  (3) a drug for improving a sensitivity of a KRas mutant-type tumor to a tumor-targeted drug.

Preferably, the KRas protein in (1) comprises a wild-type KRas protein and a mutant-type KRas protein.

Preferably, the mutant-type KRas protein comprises the KRas protein mutated at one or more amino acid positions of G12, G13, S17, P34, A59, Q61 and A146.

Preferably, the tumor in (2) is a KRas-related tumor; and is at least one selected from the group consisting of colorectal cancer, pancreatic cancer, renal cancer, lung cancer, liver cancer, breast cancer, prostate cancer, gastrointestinal cancer, peritoneal cancer, melanoma, endometrial cancer, ovarian cancer, cervical cancer, uterine cancer, bladder cancer, glioblastoma, brain metastasis, salivary gland cancer, thyroid cancer, brain cancer, lymphoma, myeloma, and head and neck cancer.

Preferably, the KRas mutant-type tumor in (3) is a tumor related to the mutant-type KRas protein.

Preferably, the mutant-type KRas protein is the KRas protein mutated at one or more amino acid positions of G12, G13, S17, P34, A59, Q61 and A146.

Preferably, the tumor-targeted drug is an epidermal growth factor receptor (EGFR)-targeted drug. Further, the tumor-targeted drug is gefitinib.

In the eighth aspect of the present disclosure, a drug is provided, which comprises the fusion protein in the first aspect of the present disclosure and a pharmaceutically acceptable excipient.

In the ninth aspect of the present disclosure, a combination drug is provided, which comprises at least one of the fusion protein in the first aspect of the present disclosure and the drug in the eight aspect of the present disclosure, and a tumor-targeted drug.

Preferably, the tumor-targeted drug is an epidermal growth factor receptor (EGFR)-targeted drug. Further, the tumor-targeted drug is gefitinib.

The present disclosure has the beneficial effects as follows:

The fusion protein with tumor targeting, penetrability and specific protein degradation is designed and constructed direct to an undruggable protein for the first time, thus providing a new idea for development of an anti-cancer targeted drug. Different from the prior art in which one molecule can only target one target protein, the fusion protein can simultaneously induce degradation of the wild-type and mutant-type KRas proteins. Meanwhile, the fusion protein can improve the sensitivity of the KRas mutant-type tumor to the tumor-targeted drug by inducing degradation of KRas, thus expanding an application range of existing anti-cancer targeted drugs and having important significance in tumor clinic treatment.

Compared with the target protein degradation technology induced by the chimeric molecule, the fusion protein provided by the present disclosure is simple in synthesis, convenient in production due to prokaryotic or eukaryotic expression, and high in action efficiency. In addition, the fusion protein is easier for large-scale production and commercial application.

DETAILED DESCRIPTION

The contents of the present disclosure are further described in detail hereinafter with reference to the specific examples.

It should be understood that the examples are only used for describing the present disclosure and are not intended to limit the scope of the present disclosure.

If the specific conditions are not indicated in the following examples, the conventional conditions or the conditions suggested by the manufacturers shall be used. Unless otherwise specified, the materials and reagents used in the examples are all commercially available materials and reagents.

EXAMPLE 1 CONSTRUCTION OF KRAS PROTEIN DEGRADATION SYSTEM TKD AND EFFECT VERIFICATION THEREOF

In the example, taking a nanobody-mediated KRas protein targeting degradation system TKD designed and constructed to rapidly and efficiently reduce expression of wild-type or mutant-type KRas in colorectal cancer cells as an example, the feasibility and advantages of the technical solution of the present disclosure are demonstrated and confirmed. The KRas protein plays an important role in maintaining growth of the colorectal cancer cells, so that it is of great significance to design an effective inhibitory drug for KRas for clinic treatment of the colorectal cancer. However, KRas is a member of "undruggable proteins", and there is no KRas targeted drug used in clinic treatment so far.

Figure 1:
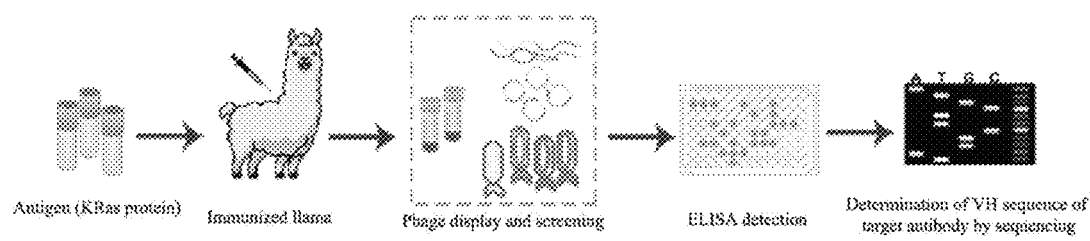
FIG. 1 is a flow chart of immunizing a llama and screening a nanobody of a target protein.

I. Preparation of TKD Molecule of Fusion Protein (I) Design and Construction of TKD Molecule Tool 1. Screening of Sequence of KRas Nanobody VHH In the example, a llama was repeatedly immunized with high-purity KRas protein (with an amino acid sequence of MTEYKLVVVGAGGVGKSALTIQLIQNHFVDEYDP-TIEDSYRKQVVIDGETCLLDILDTAGQ EEY-SAMRDQYMRTGEGFLCVFAINNTKSFEDIHHY-REQIKRVKDSEDVPMVLVGNKCDLPS RTVDTKQAQDLARSYGIPFIET-SAKTRQRVEDAFYTLVREIRQYRLKKISKEE-KTPGCVKIKKCIIM, SEQ ID NO.7) for four times, i.e., the llama was immunized with 5 mg of purified target protein (KRas) for four times, 15 days each time. Leukocytes of the immunized llama were extracted, and mRNA was isolated to construct an antibody gene phage display library. The sequence of the target antibody VHH was determined by phage screening, ELISA detection and sequencing, and finally, the sequence of the KRas protein nanobody VHH with a high affinity was obtained. The screening flow of the sequence of the KRas nanobody VHH was shown in FIG. 1. The specific steps were as follows.

Figure 2:
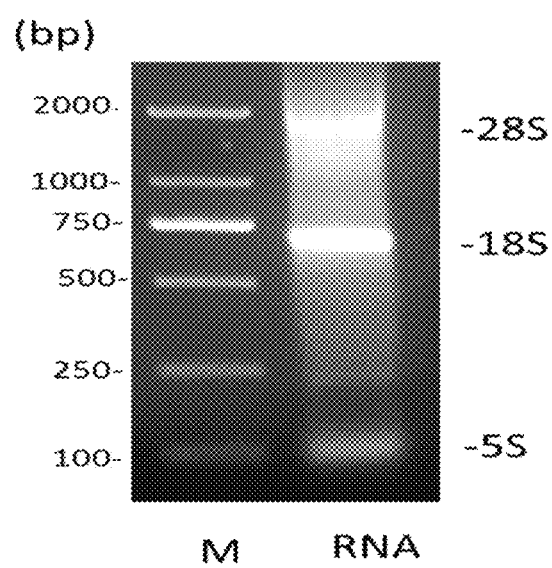
FIG. 2 is a graph showing the agarose gel electrophoresis of total RNA of llama peripheral blood lymphocytes, wherein M represents Marker.

1.1 RNA Extraction and Reverse Transcription 1.1.1 RNA Extraction:
  (1) Llama peripheral blood lymphocytes preserved in Trizol were transferred to a 1.5 mL centrifuge tube, and ⅕ volume of chloroform was added to mix evenly.
  (2) After standing at a room temperature for 5 minutes, the mixture was centrifuged at 4° C. and 12,000 g for 15 minutes.
  (3) The supernatant after centrifugation was transferred to a new centrifuge tube.
  (4) An equal volume of isopropanol was added into the new centrifuge tube, and reversed and mixed evenly.
  (5) After standing at the room temperature for 10 minutes, the mixture was centrifuged at 4° C. and 12,000 g for 10 minutes, and the supernatant was removed.
  (6) 75% ethanol was added to wash the precipitate, and centrifuged at 4° C. and 7,500 g for 5 minutes, and dried in air at the room temperature to obtain a dried precipitate. The dried precipitate was dissolved in DEPC treated water, and all the samples were combined after dissolution to obtain total RNA. The result of gel electrophoresis of total RNA was shown in FIG. 2.

1.1.2 cDNA Reverse Transcription:
  (1) Total RNA obtained was reversely transcribed by using a Takara reverse transcription kit. The total RNA sample above was divided into two samples, wherein one sample used Oligo dT Primer in the kit as a primer, and the other sample used Random 6-mers in the kit as a primer. The total RNA obtained above as a template was reversely transcribed into cDNA according to the instruction of the reverse transcription kit, and stored in two centrifuge tubes respectively.

Figure 3:
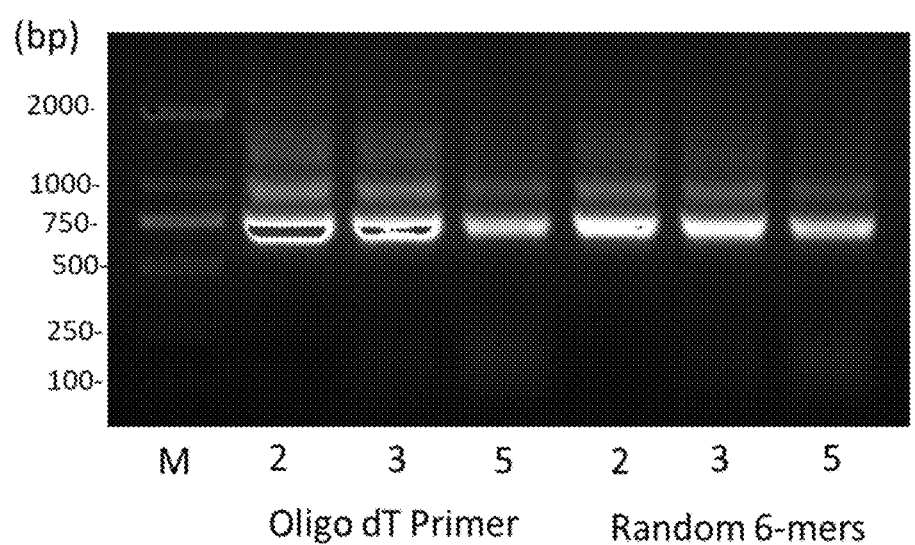
FIG. 3 is a graph showing the agarose gel electrophoresis of cDNA of oligo dT Primer and random 6-mer with different amounts, wherein M represents Marker.

1.2 PCR Amplification 1.2.1 First Round of PCR Amplification:
  (1) The first round of PCR amplification was carried out with cDNA as the template, and the Taq DNA Polymerase Hot Start enzyme. In order to determine an optimal amount of template, 2 μL, 3 μL and 5 μL of cDNA of oligo dT Primer and cDNA of random 6-mer were used as templates respectively. The PCR reaction system was as follows: 2/3/5 μL of cDNA (concentration of 800 ng/ul); 2 μL/2 μL of CALL 001/CALL 002 (Shenzhen Kangti Life); 4 μL of dNTP Mix; 5 μL of 10×ExTaq Buffer; 0.25 μL of HS Ex Taq; added ddH$_2$O to 50 μL. The PCR reaction system was as follows: 98° C. for 3 minutes; 94° C. for 50 seconds, 55° C. for 30 seconds, 72° C. for 40 seconds+2 seconds/cycle, and 23 cycles; 72° C. for 5 minutes; and 4° C. for ∞.
  (2) After finishing the reaction, 20 μL of PCR products were taken for 1% agarose gel electrophoresis, and results of agarose gel electrophoresis of different amounts of cDNA template were shown in FIG. 3. The template amount with a single target band and fragment size of 600 bp in the electrophoresis results was finally selected as the optimal template amount. PCR reaction was carried out on all cDNA according to such template amount under same conditions.
  (3) All the PCR products were subjected to 1% agarose gel electrophoresis, cut and recovered to obtain the band with target fragment size of about 600 bp.
  (4) All the purified and recovered products were collected into a centrifuge tube, which were first round of PCR amplification products, and stored at −20° C.

Figure 4:
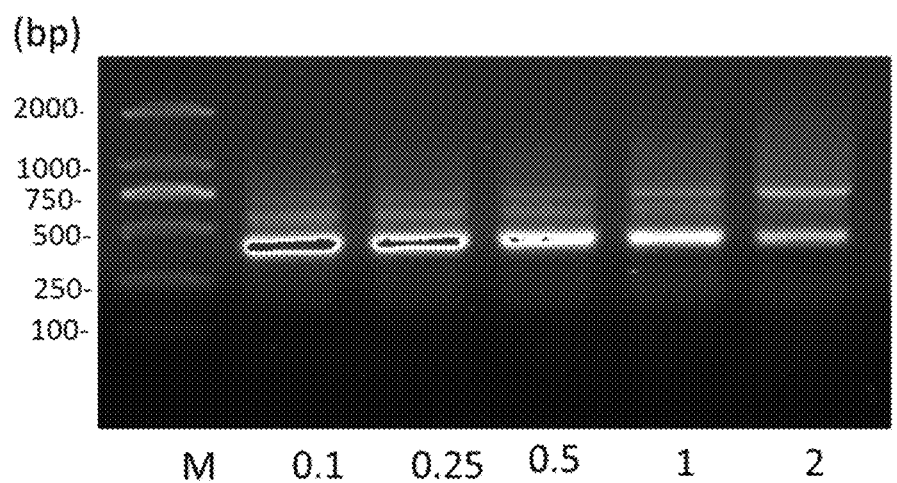
FIG. 4 is a graph showing the agarose gel electrophoresis of different amounts of cDNA templates, where M represents Marker.

1.2.2 Second Round of PCR Amplification
  (1) The first round of PCR amplification products were used as templates for second round of PCR amplification. In order to determine the optimal amount of template, 0.1 μL, 0.25 μL, 0.5 μL, 1 μL and 2 μL of the first round of PCR amplification products were used as the templates respectively. The PCR reaction system was as follows: 0.1/0.25/0.5/1/2 μL of cDNA (concentration of 800 ng/μL); 2 μL/2 μL of VHH-for/VHH-back (Shenzhen Kangti Life); 4 μL of dNTP Mix; 5 μL of 10×ExTaq Buffer; 0.25 μL of HS Ex Taq; added ddH$_2$O to 50 μL. The PCR reaction system was as follows: 98° C. for 3 minutes, 94° C. for 50 seconds, 55° C. for 30 seconds, 72° C. for 40 seconds, 11 cycles; 72° C. for 5 minutes; and 4° C. for ∞.
  (2) After finishing the reaction, 20 μL of PCR products were taken for 1% agarose gel electrophoresis, and results of agarose gel electrophoresis of different amounts of cDNA template were shown in FIG. 4. The template amount with a single target band and fragment size of 600 bp in the electrophoresis results was finally selected as the optimal template amount. PCR reaction (a total of 192 reactions) was carried out on ⅓ volume of the first round of PCR amplification products obtained according to such template amount by using the method described in 1.2.2. (1). All the recovered products were collected into a centrifuge tube, which were second round of PCR amplification products. Meanwhile, 2 μL of the recovered product was taken and detected the concentration with a nucleic acid concentration measuring instrument, and the result was recorded. Other products were stored at −20° C., and subjected to PCR reaction under the same conditions. The PCR reaction solution was subjected to DNA purification by using a universal DNA purification recovery kit.
  (3) All the purified and recovered products were collected into a centrifuge tube, which were the purified second round of PCR amplification products. Meanwhile, 2 μL of the purified and recovered product was taken and detected the concentration with a nucleic acid concentration measuring instrument, and the result was recorded. Other products were stored at −20° C.

1.3 Enzyme Digestion and Linking 1.3.1 Enzyme Digestion of Vector and PCR Products:
  (1) pComb3XSS was used as a phage plasmid vector, and 20 μg of pComb3XSS vector and 10 μg of second round of PCR amplification products were digested with Spe I and Sac I respectively, and incubated at 37° C. for 4 hours.
  (2) The pComb3XSS vector and the second round of PCR amplification products were purified by using a DNA recovery and purification kit, and stored at 4° C.

1.3.2 Linking
  (1) The vector was linked to the fragment, and the linking reaction system was as follows: 1.6 μg of digested PCR products; 4 μg of digested vector (pComb3XSS); 30 μL of T4 ligase; 200 μL of 10×T4 reaction Buffer; and added ddH$_2$O to 2,000 μL.

(2) The linking reaction system was incubated at 4° C. overnight (about 16 hours).

(3) The linking reaction solution was purified by using a universal DNA purification and recovery kit. The concentration of recovered products was detected, and the recovered products were stored at 4° C.

1.4 Construction of Bacterial Library and Phage Library

1.4.1 Verification of Conversion Rate of Linking Products (1) 50 μL of TG1 competent cells were put on ice for 5 minutes to 10 minutes to melt.

(2) 100 ng of linking products were added, and transferred into pre-cooled electroporation cuvettes with a spacing of 1 mm, and then subjected to electroporation with the parameters (1800 V, 1 mm).

(3) 1 mL of SOC culture solution pre-heated at 37° C. was immediately added after finishing the electroporation, mixed evenly, and shaken and resuscitated at 37° C. and 200 rpm for 1 hour.

(4) 100 μl of resuscitated bacterial solution was taken from 1 mL of resuscitated bacterial solution, then subjected to 10-fold gradient dilution and spread on a plate, and the number of converted colonies obtained in each reaction was calculated according to the dilution ratio and the number of single colonies, which was the conversion efficiency of the linking products.

Figure 5:
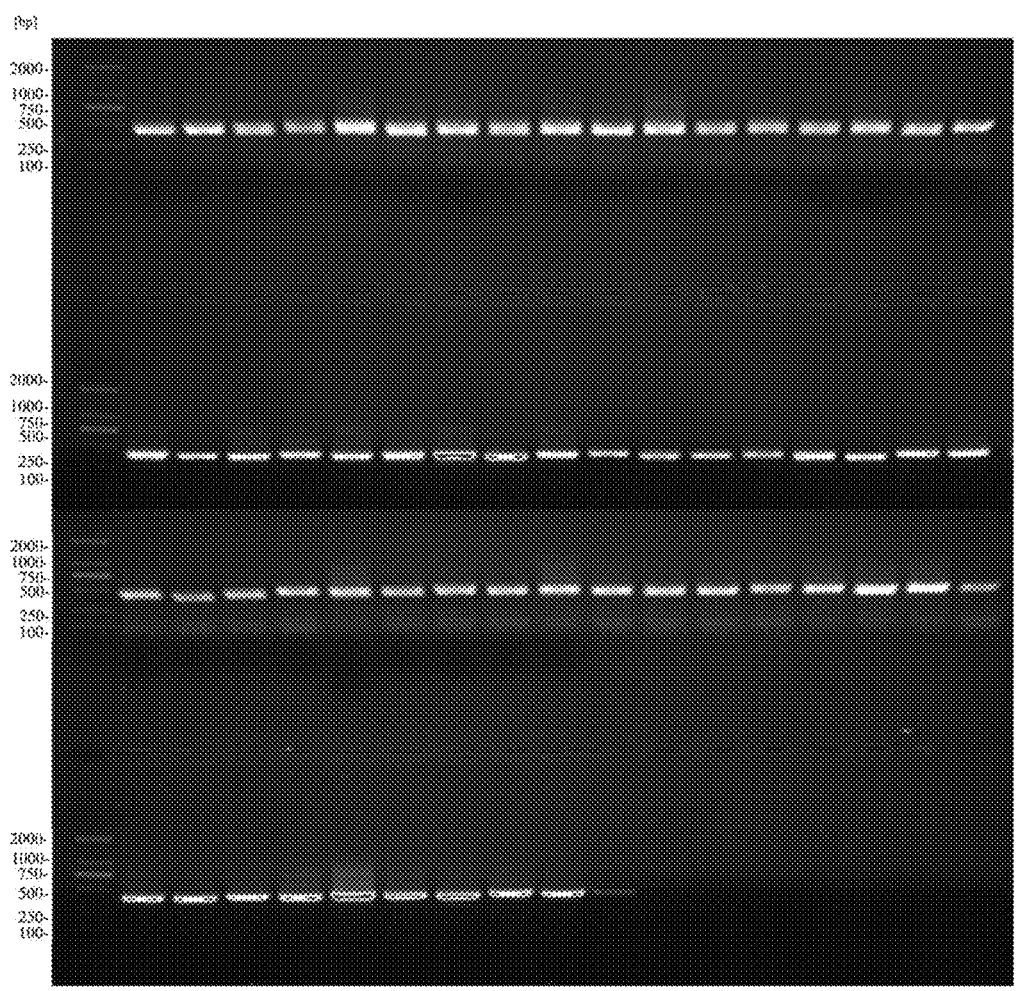
FIG. 5 is a graph showing the agarose gel electrophoresis of colony PCR.

(5) Meanwhile, 48 monoclonal bacteria were randomly selected for colony PCR. The PCR reaction system was as follows: 2 μL of bacterial solution ($OD_{600}$=49.15); 2 μL/2 μL of VHH-for/VHH-back (Shenzhen Kangti Life); 4 μL of dNTP Mix; 5 μL of 10×ExTaq Buffer; 0.25 μL of HS Ex Taq; added dd$H_2O$ to 50 μL. The PCR reaction system was carried out as follows: 98° C. for 3 minutes; 94° C. for 50 seconds, 55° C. for 30 seconds, 72° C. for 40 seconds, 11 cycles; 72° C. for 5 minutes; and 4° C. for ∞. In PCR products, the single band with about 600 bp was considered as a positive clone (the result of agarose gel electrophoresis of colony PCR was shown in FIG. 5), so that the positive rate of monoclone was estimated.

1.4.2 Construction of Bacterial Library (1) 20 tubes of competent cells were subjected to the electroporation reaction by using the above method.

(2) After resuscitating at 37° C. for 1 hour, 100 μL of resuscitated bacterial solution was subjected to 10-fold gradient dilution, then spread on a plate, and cultured overnight at 37° C.

(3) All the remaining bacterial solutions were collected and evenly spread on six 245 mm square culture plates, and cultured in 2×YT culture medium containing 100 μg/mL Amp (ampicillin) overnight at 37° C.

(4) The number of converted colonies obtained by all the reactions were calculated according to the dilution ratio and the number of single colonies, which was the capacity of the bacterial library.

(5) Meanwhile, 60 monoclonal bacteria were randomly selected from the gradient dilution plate for colony PCR, and the PCR reaction system was as follows: 2 μL of bacterial solution ($OD_{600}$=49.15); 2 μL/2 μL of VHH-for/VHH-back (Shenzhen Kangti Life); 4 μL of dNTP Mix; 5 μL of 10×ExTaq Buffer; 0.25 μL of HS Ex Taq; added dd$H_2O$ to 50 μL. The PCR reaction system was as follows: 98° C. for 3 minutes; 94° C. for 50 seconds, 55° C. for 30 seconds, 72° C. for 40 seconds, 11 cycles; 72° C. for 5 minutes; and 4° C. for ∞. The clone positive rate of the bacterial library was verified.

(6) The colonies cultured on the 245 mm square culture plate overnight were scraped off with a 2×YT liquid culture medium, placed in a 50 mL centrifuge tube, and measured for the $OD_{600}$ value. The glycerol with a final concentration of 20% was added to the colonies, and the colonies were store at −80° C.

1.4.3 Preparation of Phage Library (1) The volume of the bacterial library to be added in 100 mL of 2×YT liquid culture medium was calculated according to the $OD_{600}$ of the bacterial library. The bacterial library was inoculated into 100 mL of 2×YT liquid culture medium (containing 100 μg/mL Amp) according to the calculation result, and cultured at 37° C. and 250 rpm until the $OD_{600}$ was 0.5 to 0.55.

(2) According to the titer of the helper phage M13K07, the helper phage was added according to the ratio of 1:20 (the number of bacteria: the number of phages), and incubated at 37° C. and 250 rpm for 30 minutes.

(3) Kana (kanamycin) with the final concentration of 50 μg/mL was added, and cultured overnight at 30° C. and 250 rpm.

(4) The bacterial solution cultured overnight was centrifuged at 4° C. and 4,000 rpm for 10 minutes, and then the centrifuged supernatant was transferred into a new 50 mL centrifuge tube.

(5) ¼ of pre-cooled 20% PEG/2.5 M NaCl storage solution was added, mixed evenly, and stood on ice and incubated for 30 minutes.

(6) After centrifugation at 4° C. and 4,000 rpm for 20 minutes, the supernatant was discarded, and the centrifuge tube was inverted and dried for 2 minutes.

(7) 1 mL of PBS was added, resuspended in a new centrifuge tube, and centrifuge at 4° C. and 12000 rpm for 20 minutes.

(8) After centrifugation, the supernatant was transferred into a new centrifuge tube, and ¼ volume of pre-cooled 20% PEG/2.5 M NaCl storage solution was added again, mixed evenly, and incubated on ice for 10 minutes.

(9) The mixture was centrifuged at 4° C. and 12000 rpm for 10 minutes, the supernatant was discarded. The mixture was resuspended with 1 mL of PBS, and centrifuged at 12000 rpm for 2 minutes, and the supernatant was transferred into a new centrifuge tube, and stored at −80° C., thus obtaining a purified phage library.

(10) 10 μL of the purified phage library was diluted in 1.5 mL centrifuge tubs for 10-fold gradient dilution, with 12 gradients in total, that was, 10 μL of phage library was diluted to 100 μL, then 10 μL of diluted phage library was taken from 100 μL of diluted phage library and diluted to 100 μL, and so on. The dilution was carried out by 12 gradients in total to $10^{-12}$, and the diluted phage library was shaken and mixed evenly.

(11) 90 μL of TG1 bacterial solution was added into each dilution centrifuge tube, mixed evenly, and then incubated at 37° C. for 30 minutes.

(12) 5 μL bacterial solution was taken from each dilution centrifuge tube, dropwise added into 2×YT solid culture medium (Amp), and cultured overnight at 37° C.

(13) The number of single colonies capable of clearly distinguishing the dilution ratio of the single colonies on the plate was counted, and the titer of the phage library was calculated according to the following formula: titer of phage library=the number of single colonies on corresponding dilution ratio×dilution ratio×400.

2 Immunoscreening

2.1 First Cycle of Screening 2.1.1 The screened antigen KRas protein was taken out from the refrigerator with the temperature of −80° C., and placed on ice and thawed.

2.1.2 The screened antigen was coated with the immune tube (50 μg/tube, the coating solution was a CBS buffer solution, pH 9.6, 2 mL/tube), and rotated slowly overnight at 4° C., and meanwhile, BSA was coated in parallel as a control.

2.1.3 The liquid in the immune tube coated overnight was discarded, and 2 ml of PBS buffer solution was added to clean the immune tube at a room temperature for three times, and rotated for 5 minutes each time.

2.1.4 2 mL of blocking solution (3% BSA) was added, and rotated and blocked at the room temperature for 2 hours.

2.1.5 The liquid in the blocked immune tube was discarded, and 2 mL of PBST buffer solution (1×PBS containing 0.1% Tween20, the same below) was added to clean the immune tube at the room temperature for three times, and rotated for 5 minutes each time.

2.1.6 The cleaning solution in the immune tube wad discarded, and 1 mL of PBS was added into the immune tube. The volume of added phage was calculated according to the following formula. Then, 32 μL of prepared phage library was added into the immune tub as the phage library inputted in the first cycle of screening, and rotationally incubated at the room temperature for 1 hour:

$$V(\mu L) = \frac{10^{12}}{T_{library}} \times 1000$$

wherein, V was the volume of added phage (unit: μL), and $T_{library}$ was the titer of the phage.

2.1.7 The liquid in the immune tube was discarded, and 2 mL of PBST buffer solution (1×PBS containing 0.1% Tween20, the same below) was added to clean the immune tube at the room temperature for 20 times, and rotated for 5 minutes each time.

2.1.8 The liquid in the immune tube was discarded, and the residual liquid was removed as much as possible. 1 mL of 0.25 mg/ml Trypsin solution was added into the immune tube, rotated and eluted at the room temperature for 30 minutes.

2.1.9 10 μL of 10% AEBSF (4-2-aminoethyl)benzene-sulfonyl fluoride) was added to stop the elution, and the solution in the immune tube was transferred into a new 1.5 mL centrifuge tube, which was the phage eluent of the first cycle of screening.

2.2 Titer Detection of First Cycle of Phage Eluent 2.2.1 The TG1 bacterial strain stored in a refrigerator with the temperature of −80° C. was subjected to single colony streaking in the 2×YT solid culture medium, and cultured overnight at 37° C. (stored at 4° C. for one week). One single colony was selected from the single colony plate, and cultured in 5 mL of 2×YT culture medium overnight at 37° C.

2.2.2 500 μL of bacterial solution cultured overnight was transferred to 5 mL of 2×YT liquid culture medium, and cultured at 37° C. and 250 rpm for about 45 minutes to 60 minutes until $OD_{600}$ was 0.5 to 0.55.

2.2.3 10 μL of the first cycle of phage eluent was diluted in 1.5 mL centrifuge tubes for 10-fold gradient dilution, with 12 gradients in total, that was, 10 μL of first cycle of phage eluent was diluted to 100 μL, then 10 μL of diluted phage eluent was taken from 100 μL of diluted phage eluent and diluted to 100 μL, and so on. The dilution was carried out by 12 gradients in total to $10^{-12}$, and the diluted phage eluent was shaken and mixed evenly.

2.2.4 90 μL of TG1 bacterial solution was added into each dilution centrifuge tube, mixed evenly, and then incubated at 37° C. for 30 minutes.

2.2.5 5 μL of bacterial solution was taken from each dilution centrifuge tube, dropwise added into 2×YT solid culture medium (Amp), and inverted and cultured overnight at 37° C.

2.2.6 The number of single colonies capable of clearly distinguishing the dilution ratio of the single colonies on the plate was counted, and the number of phagemids in each milliliter of phage solution was calculated according to the following formula, which was the titer of the phage library:

$$T(puf/mL) = N \times D \times 400$$

wherein, T was the titer of the phage (unit: pfu/mL), D was the dilution ratio, and N was the number of single colonies of corresponding dilution ratio.

2.3 Amplification of First Cycle of Phage Eluent 2.3.1 The TG1 bacterial strain stored in a refrigerator with the temperature of −80° C. was subjected to single colony streaking in the 2×YT solid culture medium, cultured overnight at 37° C., and stored at 4° C. for one week. One single colony was selected from the single colony plate, and cultured in 5 mL of 2×YT culture medium overnight at 37° C.

2.3.2 500 μL of bacterial solution cultured overnight was transferred to 5 mL of 2×YT liquid culture medium, and cultured at 37° C. and 250 rpm for about 45 minutes to 60 minutes until the $OD_{600}$ value was 0.5 to 0.55.

2.3.3 500 μL of phage eluent obtained after the first cycle of screening was added into the bacterial solution with $OD_{600}$ of 0.5 to 0.55, and the remaining eluent was stored at 4° C.

2.3.4 Culture was continued at 37° C. and 250 rpm for 30 minutes.

2.3.5 All the bacterial solutions were evenly spread on a 245 mm square culture medium plate containing 2% agarose which contains 100 μg/mL Amp, and cultured overnight at 37° C.

2.3.6 6 mL of 2×YT liquid culture medium (containing 100 μg/mL Amp) was added onto the surface of the square plate cultured overnight, colonies on the square plate were scraped off gently with a spreading rod, and a bacterial solution was collected into a 15 mL centrifuge tube, which was the amplified bacterial sublibrary. Meanwhile, the $OD_{600}$ value of the bacterial solution was measured by using a spectrophotometer, which was the $OD_{600}$ value of the eluent bacterial library, and glycerol with a final concentration of 20% was added, which was the first cycle of bacterial library.

2.3.7 For the eluent bacterial library, the corresponding volume of the bacterial solution was calculated according to the following formula. The bacterial solution was transferred to 100 mL of 2×YT liquid culture medium (containing 100 µg/mL Amp), so that the initial $OD_{600}$ was 0.1.

$$V(\mu L) = \frac{10}{OD_{600}} \times 1000$$

Wherein, V was the volume (unit: µL) of the transferred bacterial solution, and $OD_{600}$ was $OD_{600}$ of the constructed eluent bacterial library.

2.3.8 The bacterial solution was cultured at 37° C. and 250 rpm until the $OD_{600}$ of the bacterial solution reached 0.5 to 0.55.

2.3.9 The volume of helper phage M13K07 was calculated according to the following formula. The helper phage M13K07 was added to meet that the ration of the number of bacteria and the number of phages is 1:20.

$$V(mL) = \frac{OD_{600} \times 1.6 \times 10^{12}}{T_{helper-phage}}$$

Wherein, V was the volume of the helper phage added (unit: mL), $T_{helper-phage}$ was the titer of the helper phage used, and $OD_{600}$ was the $OD_{600}$ value of the bacterial solution;

2.3.10 Culture was continued at 37° C. and 250 rpm for 30 minutes.

2.3.11 Kana with a final concentration of 50 µg/mL was added respectively, and cultured overnight at 30° C. and 250 rpm.

2.4 Purification of First Cycle of Phage 2.4.1 The bacterial solution cultured overnight was transferred to a new 50 mL centrifuge tube and centrifuged at 4° C. and 4,000 rpm for 10 minutes.

2.4.2 After centrifugation, the supernatant was transferred into a new 50 mL centrifuge tube, and ¼ volume of 20% PEG/2.5 M NaCl pre-cooled at 4° C. was added, mixed evenly, and then placed on ice for 30 minutes.

2.4.3 The mixture was centrifuged at 4° C. and 4,000 rpm for 20 minutes, the supernatant was discarded, and the mixture was inverted on paper for 2 minutes.

2.4.4 1 mL of PBS was added for resuspension and precipitation, and the resuspension solution was transferred to a new 1.5 mL centrifuge tube, and centrifuged at 4° C. and 13,000 rpm for 20 minutes.

2.4.5 After centrifugation, the supernatant was transferred into a new 1.5 mL centrifuge tube, and ¼ volume of pre-cooled 20% PEG/2.5 M NaCl solution was added, mixed evenly, and then placed on ice for 10 minutes.

2.4.6 The mixture was centrifuged at 4° C. and 13,000 rpm for 10 minutes, the supernatant was discarded, and 1 mL of PBS was added for resuspension and precipitation.

2.4.7 The mixture was centrifuged at 4° C. and 13,000 rpm for 2 minutes, and the supernatant was transferred to a new 1.5 mL centrifuge tube, which was the phage sub-library of the first cycle of screening. The phage sub-library of the first cycle of screening was packed by 100 µL/tube, and stored at −80° C. for a long time, or stored at −20° C. for a short time (1 week to 2 weeks).

2.4.8 The titer of the phage sub-library of the first cycle of screening was detected by a method the same as that in 2.2.

2.5 Second Cycle of Screening

The screening method was the same as that in 2.1. 0.25 mL of the phage sub-library obtained in the first cycle of screening was used as the input phage library of the second cycle of screening to obtain the phage eluent of the second cycle of screening.

2.6 Titer Detection of Second Cycle of Phage Eluent

The method was the same as that in 2.2.

2.7 Amplification and Purification of Second Cycle of Eluent

Methods were the same as those in 2.3 to 2.4, and the phage sub-library of the second cycle of screening was obtained.

2.8 Titer Detection of Phage Sub-Library of Second Cycle of Screening

A method was the same as that in 2.2.

2.9 Third Cycle of Screening

The screening method was the same as that in 2.1. 0.25 mL of the phage sub-library obtained in the second cycle of screening was used as the input phage library of the third cycle of screening to obtain the phage eluent of the third cycle of screening.

2.10 Titer Detection of Third Cycle of Phage Eluent

The method was the same as that in 2.2.

2.11 Monoclonal ELISA Detection 2.11.1 The TG1 bacterial strain stored in a refrigerator with the temperature of −80° C. was subjected to single colony streaking in the 2×YT solid culture medium, cultured overnight at 37° C., and stored at 4° C. for one week. One single colony was selected from the single colony plate, and cultured in 5 mL of 2×YT culture medium overnight at 37° C.

2.11.2 500 µL of bacterial solution cultured overnight was transferred to 5 mL of 2×YT liquid culture medium, and cultured at 37° C. and 250 rpm for about 45 minutes to 60 minutes until the $OD_{600}$ value was 0.5 to 0.55.

2.11.3 10 µL of third cycle of phage eluent was diluted in 1.5 mL centrifuge tubes for 10-fold gradient dilution, with 12 gradients in total, that was, 10 µL of phage library was diluted to 100 µL, then 10 µL of diluted phage library was taken from 100 µL of diluted phage library and diluted to 100 µL, and so on. The dilution was carried out by 12 gradients in total, and the diluted phage library was shaken and mixed evenly.

2.11.4 90 µL of bacterial solution with the $OD_{600}$ value of 0.5 to 0.55 was added into each dilution centrifuge tube, and mixed evenly.

2.11.5 Culture was continued at 37° C. and 250 rpm for 30 minutes.

2.11.6 The bacterial solution was evenly spread on the 2×YT solid culture medium plate containing 100 µg/mL Amp, and cultured overnight at 37° C.

2.11.7 The monoclonal colony was randomly selected from the culture medium plate cultured overnight, and spread on the sterile 96-well cell culture plate (P1-P2), added with 200 µL of 2×YT culture medium (containing 100 µg/mL Amp) in each well, and stood and cultured overnight at 37° C.

2.11.8 2 µL of bacterial solution cultured overnight was transferred to a new 96-well cell culture plate with 200 µL of 2×YT liquid culture medium (containing 100 µg/mL Amp) in each well, and stood and cultured at 37° C. for 3 hours. The bacterial solution cultured overnight before transfer was stored at 4° C.

2.11.9 The volume of helper phage M13K07 was calculated according to the following formula. The helper phage M13K07 was added in each well to meet that the ratio of the number of bacteria and the number of phages is 1:20:

$$V(\text{ml}) = \frac{OD_{600} \times 1.6 \times 10^{12}}{T_{helper-phage}}$$

Wherein, V was the volume of the helper phage added (unit: mL), and $T_{helper-phage}$ was the titer of the helper phage used.

2.11.10 The mixture was incubated at 37° C. for 30 minutes, and Kana with a final concentration of 50 μg/mL was added, and stood and cultured overnight at 30° C.

2.11.11 The 96-well culture plate cultured overnight was centrifuged at 4° C. and 4,000 rpm for 10 minutes, and stored at 4° C. for later use.

2.11.12 The screened antigen was coated with ELISA plate (1 ng/μL, the coating solution was CBS with pH 9.6, 100 μL/well), meanwhile, BSA was coated in parallel as a control. The coating was conducted at 4° C. overnight.

2.11.13 The liquid in the ELISA plate coated overnight was discarded, 200 μL of PBS buffer solution was added into each well, and the ELISA plate was cleaned at the room temperature for three times, 10 minutes each time.

2.11.14 200 μL of blocking solution (3% BSA) was added into each well to block the ELISA plate at the room temperature for 1 hour.

2.11.15 The blocking solution was discarded, and 200 μL of PBST buffer solution (1×PBS containing 0.1% Tween20, the same below) was added into each well to clean the ELISA plate at the room temperature for three times, 10 minutes each time.

2.11.16 120 μL of 3% BSA was added into each well, and then 80 μL of supernatant obtained in the centrifugation in step 2.11.11 was added, and incubated at the room temperature for 2 hours.

2.11.17 The liquid in the ELISA plate was discarded, and 200 μL of PBST buffer solution was added into each well to clean for three times, 10 minutes each time.

2.11.18 M13Bacteriophage Antibody (HRP) and Mouse Mab were added into each well, diluted in the blocking solution at a ratio of 1:40,000, and incubated for 1 hour at the room temperature by 100 μL/well.

2.11.19 The liquid in the ELISA plate was discarded, and 200 μL of PBST buffer solution was added into each well to clean for three times, 10 minutes each time.

2.11.20 100 μL of TMB one-component color developing solution was added into each well, and subjected to color development in the dark for 2 minutes to 3 minutes. 100 μL of 1 M HCl was added into each well to stop the color development, and the $OD_{450nm}$ value was read with ELIASA, and recorded and stored.

2.12 ELISA Secondary Verification of Positive Clone

In order to eliminate a false positive result, the clone preliminarily identified as being positive was subjected to ELISA secondary verification, and the method was the same as that in 2.11.

2.13 Sequencing of Positive Clone

According to ELISA detection data and secondary verification data, the positive monoclone was selected.

5 μL of positive clone bacterial solution was selected from the monoclonal ELISA detection (2.11.7) plate, inoculated into 1 mL of 2×YT culture medium (containing 100 μg/mL Amp), and cultured at 37° C. and 250 rpm until $OD_{600}$ reached 0.8 to 1.0 (about 6 hours to 8 hours). 0.5 mL of bacterial solution was sequenced, and the remaining bacterial solution was stored at 4° C.

2.14 Sequence Analysis

After sequencing, the sequence was compared and analyzed by using GENtle software, and the antibody sequence was translated into an amino acid by using the GENtle software. The obtained amino acid sequence was:

(SEQ ID NO. 1)
DVQLQESGGGLVQAGGSLRLSCVASGRTFSTYPTGWFRQA

PGKEREFVARINLSGGITNYADSVKGRFTISRDNAKNTVY

LQMNSLKPEDTAVYYCGGGSTTWAGGIPTNFDYWGQGTQV

TVSSGR.

3. Construction of TKD Expression Vector

Figure 6:
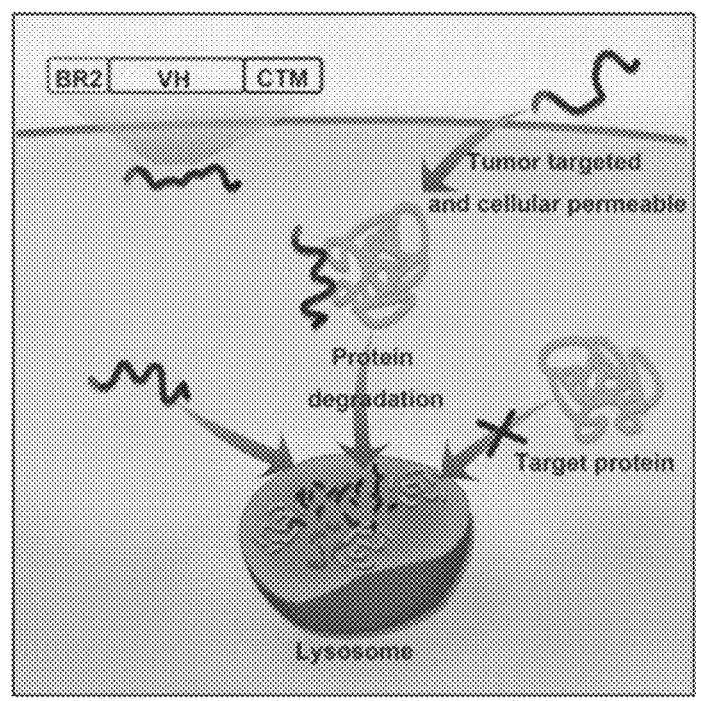
FIG. 6 is a schematic diagram of constructing the molecule of the KRas protein degradation system (TKD) and inducing target protein degradation.

The DNA sequence containing molecular elements such as BR2, a nanobody (VHH) and CTM was synthesized and cloned to the prokaryotic expression vector pET28a (a plasmid was synthesized and constructed by Suzhou Synbio Technologies Co., Ltd.). The synthesized TKD-pET28a plasmid was transformed to E.coli BL (Rosetta) competent cells. The positive recombinant was screened by a Kana resistance plate, and subjected to colony PCR verification and DNA sequencing verification, and the sequencing result was compared and analyzed by NCBI Blast. The plasmid was stored at −20° C. for a long time, and the bacterial strain with correct sequencing was added with 15% glycerol, and stored at −80° C. The arginine site of the CTM fragment in the control molecule of TKD molecule was artificially mutated into alanine (Q-A), which could not be recognized by a lysosome, and was named TKDm. The TKDm expression bacterial strain was obtained by a same method (the plasmid was synthesized and constructed by Suzhou Synbio Technologies Co., Ltd.), added with 15% glycerol, and stored at −80° C. The vector pET28a carried a 6*His tag, which could be used for expression and purification of a His protein. The schematic diagram of construction of the TKD molecule and degradation process of the TKD molecule was shown in FIG. 6.

(II) Expression and Purification of TKD System

1. TKD and TKDm were both subjected to induction expression by using isopropyl thiogalactoside (IPTG), and induction expression conditions were explored by using different IPTG concentrations, reaction temperatures and reaction times respectively. Then, the optimal expression condition was determined by using SDS-PAGE and Coomassie brilliant blue experiment. In this example, bacterial solutions of correctly sequenced TKD and the control group TKDm were inoculated into the TB culture medium containing Kana resistance (50 ng/μL), and shaken and cultured overnight at 37° C. Activated bacteria were inoculated into a fresh culture medium according to a ratio of 1:100 on the next day for expanded culture. When the bacteria were shaken and cultured at 37° C. and 220 rpm until $OD_{600}$=0.6, isopropyl thiogalactoside (IPTG) was added until the final concentration of the IPTG was 0.5 mM. Under the same condition, the induction expression was continued for about 4 hours and then the bacteria were collected. The collected bacteria were centrifuged at 4° C. and 5,000 rpm for 30 minutes, and resuspended in 1×PBS buffer solution, and then centrifuged to collect the bacteria again. The collected bacteria were resuspended in 1×PBS buffer solution again to obtain 10% bacterial solution, and the bacterial solution was repeatedly frozen and thawed in liquid nitrogen at 37° C. for three times, and then ultrasonicated in ice bath for 30 minutes (switching on for 5 seconds and switching off for 5 seconds) until the bacterial solution was completely broken. Alternatively, the bacterial solution was directly crushed with a high-pressure crusher at 4° C. under 700 Pa to 900 Pa for 8 minutes. Urea was added into the completely broken bacterial solution until the final concentration of urea was 8 M, and incubated at the room temperature for more than 30 minutes, and then the bacterial solution became clear and transparent. The bacterial solution was centrifuged at 4° C. and 10,000 rpm for 1 hour, the precipitate was discarded, and the supernatant was filtered with a filter membrane with a pore diameter of 0.22 mm. The supernatant was used for subsequent purification.

2. Denaturation, purification and renaturation of TKD molecule: the supernatant obtained above was resuspended in Ni-NTA agarose gel, and then incubated at 4° C. for 2 hours (5g of bacteria: 1 mL of 50% Ni-NTA agarose gel). The color of the Ni-NTA agarose gel was changed from blue to brown during incubation, and the Ni-NTA agarose gel was centrifuged at 4° C. and 1,000 g for 1 minute. 20 uL of supernatant was used for verifying subsequent purification effect, most supernatant was discarded, and only a little supernatant was kept for resuspending the Ni-NTA agarose gel. The resuspended Ni-NTA agarose gel was passed through a column, and washed with 1×PBS buffer solution containing 50 mM imidazole and 8 M urea for three times, two times of column volume each time. 20 uL of cleaning solution in the last time was collected. Then, the cleaning solution was eluted with 1×PBS buffer solution containing 300 mM imidazole and 8 M urea. If the Ni-NTA agarose gel became blue again, it was indicated that the elution was basically completed. 20 uL of eluent was taken as a sample, and the purification efficiency of the fusion protein of the sample kept during purification was detected with 12% SDS-PAGE. The concentration of eluted protein denaturation solution was detected, and the protein concentration was adjusted to about 1 mg/mL with 1×PBS buffer solution containing 8 M urea, added with 5% glycerol, mixed and then subjected to gradient freezing dialysis. The dialysate was 1×PBS buffer solution containing 4 M, 2 M and 0 M urea respectively, the ratio of the protein denaturation solution to the dialysate was 1:10, and the dialysis lasted for 12 hours at −10° C. in each gradient. The dialyze protein solution was centrifuged at 10,000 g for 10 minutes, and the supernatant was subjected to fusion protein concentration by using a 3KD ultrafiltration tube (Millipore, item number: UFC900396), centrifuged at 4,500 g, and ultrafiltered to 500 µL at 4° C. Then, the concentrated solution was washed with 1×PBS for three times, and centrifuged repeatedly for three times. The concentration of the concentrated protein obtained was measured by using a BCA protein concentration detection kit (Thermo Fisher, item number: 23227), and the concentrated protein was stored at −80° C.

Figure 7:
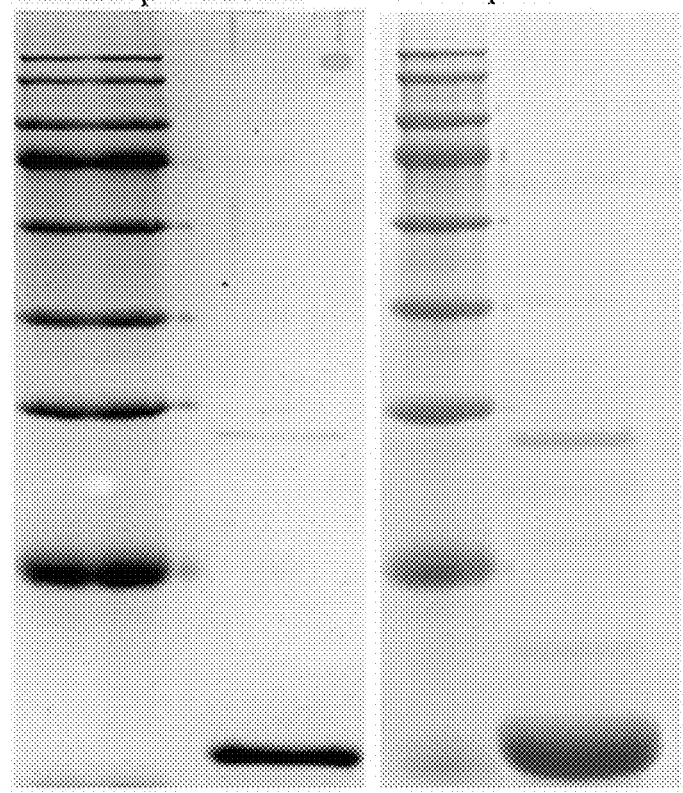
FIG. 7 is a diagram of purification effects of TKD and TKDm.

Purification effects of TKD and TKDm were shown in FIG. 7, and purities of TKD and TKDm were both over 90%, which could be used for the following experimental verification. The amino acid sequence of the TKD molecule was:

(SEQ ID NO. 4)
RAGLQFPVGRLLRRLLR

DVQLQESGGGLVQAGGSLRLSCVASGRTFSTYPTGWFRQA

PGKEREFVARINLSGGITNYADSVKGRFTISRDNAKNTVY

LQMNSLKPEDTAVYYCGGGSTTWAGGIPTNFDYWGQGTQV

TVSSGRKFERQKILDQRFFE (wherein, the single underline indicated the amino acid sequence of the specific tumour-cell-penetrating peptide BR2, SEQ ID NO.2; and the double underlined indicated the amino acid sequence of the lysosome recognition peptide CTM, SEQ ID NO.3). The amino acid sequence of the TKDm molecule was:

(SEQ ID NO. 5)
RAGLQFPVGRLLRRLLRDVQLQESGGGLVQAGGSLRLSCV

ASGRTFSTYPTGWFRQAPGKEREFVARINLSGGITNYADS

VKGRFTISRDNAKNTVYLQMNSLKPEDTAVYYCGGGSTTW

AGGIPTNFDYWGQGTQVTVSSGRKFERAKILDARFFE (wherein, the single underline indicated the amino acid sequence of the specific tumour-cell-penetrating peptide BR2, SEQ ID NO.2; and the double underlined indicated the amino acid sequence of CTMmt incapable of being recognized by lysosome, SEQ ID NO.6).

II. Effect Verification on Recognition and Binding of TKD to Wild-Type and Mutant-Type KRas Proteins In this example, the binding capacity of the TKD molecule to the KRas protein was verified. Purified TKD molecule and KRas protein (the purification process of the KRas protein was consistent with "expression and purification of TKD system" described above) were used for enzyme-linked immunosorbent assay (ELISA) and surface plasmon resonance (SPR) binding capacity experiment in vitro. The co-immunoprecipitation (Co-IP) experiment was mainly used in cells to verify the binding level between the TKD molecule and the KRas protein in cells.

1. The Binding Level between the TKD Molecule and the KRas Protein in Vitro was Verified by ELISA Enzyme-linked immunosorbent assay (ELASA) was an immunoassay technology developed on the basis of immunoenzyme technology, and could also be used to detect the interaction between proteins.

(1) Control groups were set, including a blank control (NC1), a TKD+IgG control (NC2) and an IgG+KRas control (NC3), and concentrations and volumes of components in the control groups were consistent with those in experimental groups. The experimental groups include TKD and TKDm, and interactions of TKD and TKDm with the KRas protein were respectively verified.

(2) Coating: TKD and TKDm were respectively diluted to a concentration of 1 ng/µL with an ELISA coating solution (purchased from NeoBioscience, item number:

NBC01). 100 μL of coating solution was added into each well of 96-well ELISA plate to coat overnight at 4° C.

(3) Blocking: the ELISA plate was cleaned with a phosphate buffer solution (PBS) (PBS formula: 4 g of NaCl, 0.1 g of KCl, 1.815 g of disodium hydrogen phosphate dodecahydrate, and 0.12 g of dipotassium hydrogen phosphate, dissolved in 400 mL of ultrapure water, with a constant volume of 500 mL for use) for 5 minutes each time. 300 μL of 5% (w/v) bovine serum albumin was added into each well, and blocked at 37° C. for 2 hours.

(4) Adding of the purified protein KRas: 6.25 μg, 12.5 μg, 25 μg, 50 μg and 100 μg of purified protein were respectively pre-mixed and diluted in 200 μL of PBS, and the diluted KRas protein was added into the wells in sequence, and slowly shaken at the room temperature for 5 hours. Then, the ELISA plate was cleaned for five times, 5 minutes each time, according to the above cleaning method.

(5) Adding of anti-KRas antibodies (item number: 05-516, purchased from Abcam) : 1 μg of antibody was diluted in 2,000 μL of 5% BSA according to a ratio of 1: 2000 to obtain an antibody diluent, and 100 μL of the antibody diluent was added into each well, and incubated at the room temperature for 2 hours or overnight at 4° C.

(6) Cleaning off excess antibody: the cleaning method was as above, and the excess antibody was cleaned for five times, 5 minutes each time.

(7) Incubation of secondary antibody: the secondary goat anti-mouse IgG HRP with horseradish peroxidase (item number: ab6721, purchased from Abcam) was diluted according to a mass-to-volume ratio of 1:2,000 (that was, 1 μg of antibody was diluted into 2,000 μL of 5% BSA) to obtain an antibody diluent, and 100 μL of the antibody diluent was added into each well for incubation.

(8) Color development: 100 μL of ELISA color development solution TMB (purchased from NeoBioscience, item number: TMS.12) was added into each well, and stood at 37° C. for 1 minute, and then the color development was immediately stopped with 50 μL of stop solution (purchased from NeoBioscience, item number: EST001).

Figure 8A:
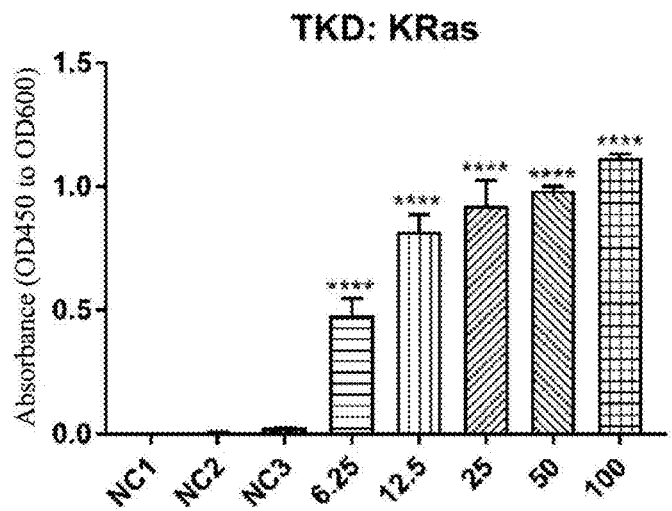
FIG. 8A is a graph showing the binding levels of the TKD molecule to the KRas protein in vitro.
Figure 8B:
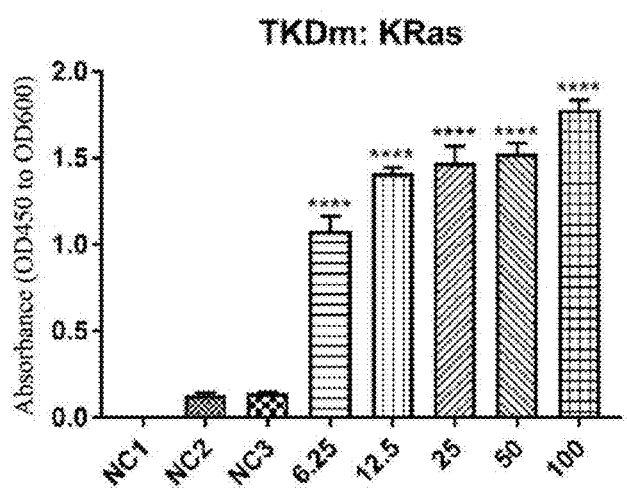
FIG. 8B is a graph showing the binding levels of the TKDm molecule to the KRas protein in vitro; ****represents that, compared with NC1, $P<0.0001$; and ns represents that, compared with NC1, there is no significant difference.

(9) Reading of value: after the color development was stable, dual-wavelength measurement was carried out by using a spectrophotometer, and the absorbance value of each well was calculated according to $OD_{450}$-$OD_{630}$, thus analyzing the drug action effect. Experimental results were shown in FIG. 8A and FIG. 8A. Compared with the control group, the TKD and the control molecule TKDm both had a stronger interaction with the KRas protein.

2. SPR binding capacity experiment was conducted by using the purified TKD molecule and KRas protein in vitro. The machine model used in the SPR experiment was BiacoreT200, and the specific operation process may be referred to "BiacoreT200 Operation Guide for Protein Detection and Protein Binding". Main steps of the example were as follows:

(1) Coupling of ligand: the target coupling amount was calculated according to the following formula:

$$R_{max} = \frac{\text{analyte MW}}{\text{ligand MW}} \times R_L \times S_m,$$

wherein $R_{max}$ was the maximum binding capacity on the chip surface, and 100 RU was usually substituted in a protein test. In this example, the coupled TKD molecule (17 kD, analyte MW) and flowing protein KRas (23 kD, ligand MW) were used. $S_m$ was a stoichiometric ratio, and was 1 in a case of being unknown. $R_L$, was the ligand coupling level, and the actual coupling amount was 1.5 times of $R_L$, in the experiment. Therefore, after calculation, $R_L$, was 74 RU, and the target coupling amount of the TKD molecule was 110 RU.

(2) Preconcentration of ligand: the TKD molecules were diluted to 10 ug/mL (at least a dilution ratio of at least 10 times) by using sodium acetate with pH 5.0, pH 4.5 and pH 4.0 respectively, and 100 uL of each diluted TKD molecule solution was prepared. Through the preconcentration experiment, it was determined that pH 5.0 was the optimal coupling condition. Therefore, 200 uL of 10 μg/mL TKD molecule solution was formally coupled by using the sodium acetate with pH 5.0.

(3) Coupling of ligand:
a. BiacoreT200 Control Software was started, Open/New wizard template under File was clicked, and immobilization was selected. In the dialog box, Chiptype was set as CM5, and Flowcell spercycle was set as 1. Flow cell2 was selected, amine coupling was selected as the method, and a ligand name of was inputted in the ligand. In this experiment, aimforimmobilized level was selected, and the calculated 110RU was inputted in target level. Flow path2 was selected as Flow path (if channel 2 of the chip had been used, channel 4 could be selected). Then, Next button was pressed, prime was selected, and the experimental temperature was selected generally as 25° C. by default.

b. Sample and Reagent Rack1 was selected in a left drop-down menu, and the sample placement position could be automatically arranged in the system (which could be rearranged by dragging through a mouse). According to the sample rack position table, enough samples were prepared (if EP tubes with covers were used, all the covers should be cut off). 100 μL of EDC was put into R1D3, 100 μL of NHS was put into R1D4, an empty tube was put into R1D5, 140 μL of ethanolamine was put into R1D6, and 166 μL of 10 μg/mL ligand protein was put into R1D1. The cover of the test tube rack was closed, and the sample rack was delivered back to the sample chamber. Next button was clicked, then the dialog box of Prepare Run Protocol popped up, the volume of the running buffer solution was confirmed to be larger than the a minimum requirement in the table, and start button was clicked.

(4) Detection process of sample:
a. In a Kinetics/Affinity interface, Flowpath point was selected as 2-1 or 4-3, and Chiptype was selected as CM5. In a Setup interface, HBS-EP was filled in a Solution column under Startup, and Numberofcycles was changed into 3. Under a Kinetics/Affinity-injectionParameter interface: in a Sample column, Contacttime was set as 120 seconds, Flowrate was set as 30 μL/min, Dissociationtime was set as 120 seconds, the regeneration condition was set as Glycine2.0, and the regeneration time was set as 30 seconds.

b. In a Kinetics/Affinity-Sample interface, analyte information was filled. The sample name was filled in Sampleid, the molecular weight was filled in MW(Da), the first Concentration was a molar concentration, which was adjusted to µM, and the second Concentration was a mass concentration, which could be automatically calculated after the molar concentration was filled (a concentration was selected for each sample to repeat sample introduction, and the sample concentrations were filled from low to high).

c. Under the Kinetics/Affinity-SystemPreparations interface, Next button was directly clicked to enter a RackPosition interface, ReagentRack was changed into SampleandReagentRack1, and Menu was clicked and then AutomaticPositioning was selected. Options in the Pooling column were all changed into Yes, VialSize was adjusted according to requirements, and medium was selected for 1.5 mL EP. The samples were prepared and placed according to their positions. The KRas protein was diluted by multiple proportions by using the running buffer solution HBS-EP. Next button was clicked, then the method was saved, then the data path was saved, and the instrument could start to run automatically.

Figure 9A:
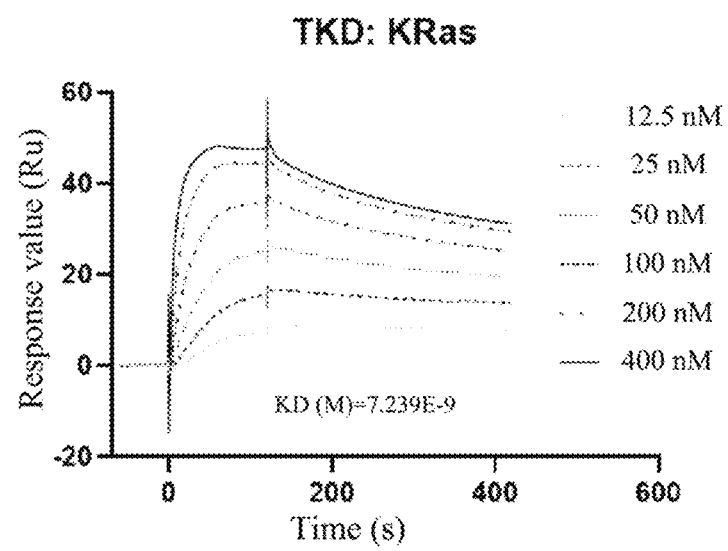
FIG. 9A is a graph showing the SPR binding ability experiments of the TKD molecule to the KRas protein.
Figure 9B:
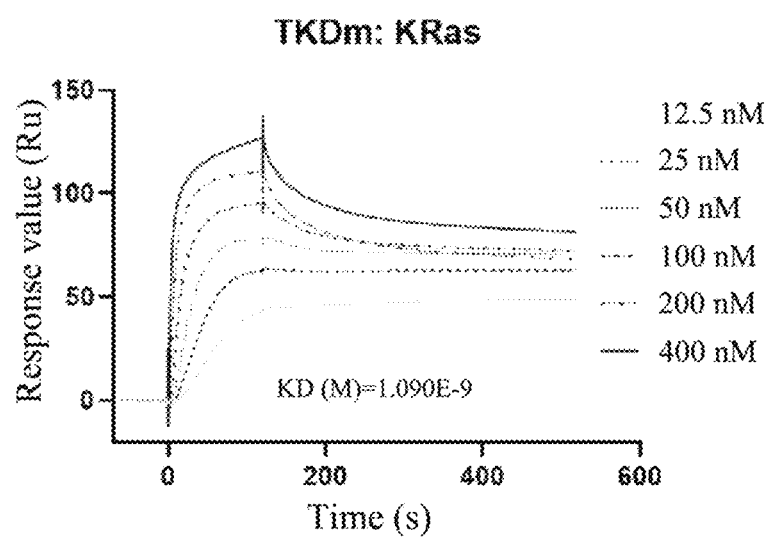
FIG. 9B is a graph showing the SPR binding ability experiments of the TKDm molecule to the KRas protein.

Results were shown in FIG. 9A and FIG. 9B, and the SPR detection results indicated that the TKD and the control molecule TKDm both had a strong binding capacity with the KRas protein in vitro, wherein binding between the TKD and the KRas protein reached the level of antigen-antibody binding (nM).

3. The binding level between the TKD molecule and the KRas protein in cells was verified.

The co-immunoprecipitation experiment (Co-IP) was an important means to detect the intracellular interaction of the protein. In order to further study and verify the mechanism and the effect of degrading the target protein by the TKD molecule, in this example, the co-immunoprecipitation experiment (Co-IP) was carried out to further study the effect of TKD. Specific operating steps of Co-IP were as follows:

(1) 1 Million colorectal cancer HT29 (KRas wt) and HCT116 (KRas G13D) cells (from American Type Culture Collection (ATCC) (item number: HTB-38, CCL-247)) were spread in a cell culture dish, and the TKD and the control molecule TKDm were respectively added to make the final concentration be 20 µg/mL. The experiment was carried out in the presence of the lysosome inhibitor Lys05 with a final concentration of 10 µM.

(2) The cells were cultured and treated at 37° C. for 24 hours, and then cleaned twice with PBS, and 1 mL of 0.25% pancreatin was added into each culture dish to digest the cells and make the cells fall off from the culture dish wall. Then, 2 mL of complete culture solution was added into each culture dish to stop the digestion, centrifuged at the room temperature and 300 g for 3 minutes, to collect the cells. The cells were resuspended in 5 mL of PBS, and repeatedly centrifuged for one time.

(3) Cleaned colorectal cancer cells were collected into a 1.5 mL EP tube. Prepared lysate that was the western and IP lysate containing 1% PMSF, 1% PI and phosphatase inhibitor (item number: P0013, purchased from Beyotime Biotechnology Company) was added. The colorectal cancer cells were lysed on ice, turned upside down for several times every 5 minutes gently without vortex, and centrifuged at 4° C. and 12,000 rpm for 30 minutes after being lysed for 30 minutes.

(4) The supernatant was transferred to a new EP tube, the protein concentration was measured by the BCA method, and then 1 mg of protein was taken from each group for a Co-IP reaction. Every group was added with 30 µL of ProteinA/G agarose and 1 µg of mouse IgG (item number: 10284-1-AP; purchased from Proteintech), rotationally incubated at 4° C. for 1 hour, then centrifuged at 4° C. and 2,500 rpm for 5 minutes, and supernatant protein samples were transferred to a new EP tube. The purpose of this step was to remove proteins in the samples that could be non-specifically bound to the Histag antibody (item number: 66005-1-Ig; purchased from Proteintech) in the next experiment.

(5) The supernatant protein samples obtained in step (4) were divided into three groups including an IgG group, an experimental group and an Input group. 2 µg of mouse IgG antibody was added in the IgG group; 2 µg of His-tag antibody was added into the protein samples in the experimental group; and the Input group was untreated, and rotationally incubated at 4° C. for 16 hours to 18 hours.

(6) 30 µL of ProteinA/G agarose beads were added into the samples of the IgG group and the experimental group respectively, and rotationally incubated at 4° C. for 4 hours.

(7) The samples of the IgG group and the experimental group were centrifuged at 2,500 rpm for 5 minutes, and the supernatants were removed. The beads were washed gently with the western and IP lysate, and then centrifuged at 2,500 rpm for 5 minutes, which was repeated for three times. The supernatant was removed, and 30 µL of SDS lysate (item number: P0013G; purchased from Beyotime Biotechnology Company) was added in each group. Meanwhile, 30 µL of protein sample was also taken from the Input group, vortically vibrated for 1 minute, boiled in boiled water for 10 minutes, and centrifuged, and the supernatant was collected in a new 1.5 mL EP tube.

(8) The protein concentration was measured by the BCA method. 30 µg of protein was taken from each group for SDS denaturation gel electrophoresis, transferred and blocked with 5% skim milk for 1 hour. Then, the KRas (item number: 12063-1-AP; purchased from Proteintech) primary antibody was added, and shaken overnight at 4° C. to remove the antibody, and the membrane was cleaned with TBST for three times, 10 minutes each time. Then, the horseradish peroxidase-labeled goat anti-mouse secondary antibody was shakily incubated at the room temperature for 1 hour, the membrane was cleaned with TBST for three times, 10 minutes each time, and the goat anti-mouse secondary antibody was luminously developed in a dark room of an ELC luminescent kit.

Figure 10A:
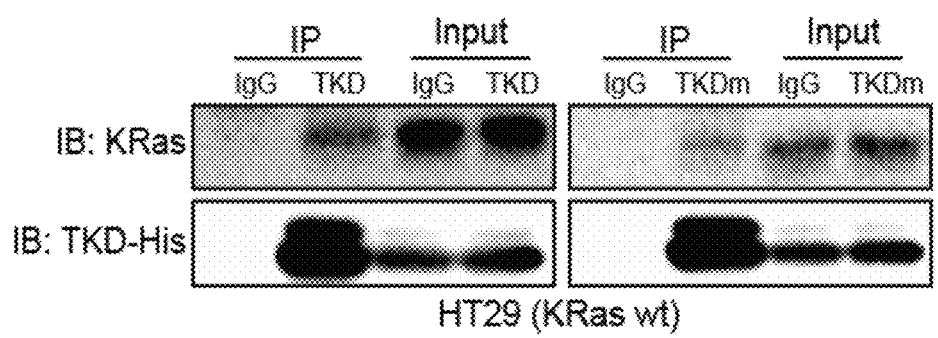
FIG. 10A is a graph showing the binding levels of the TKD molecule and the TKDm molecule to the KRas protein in the HT29 (KRas wt) cells.
Figure 10B:
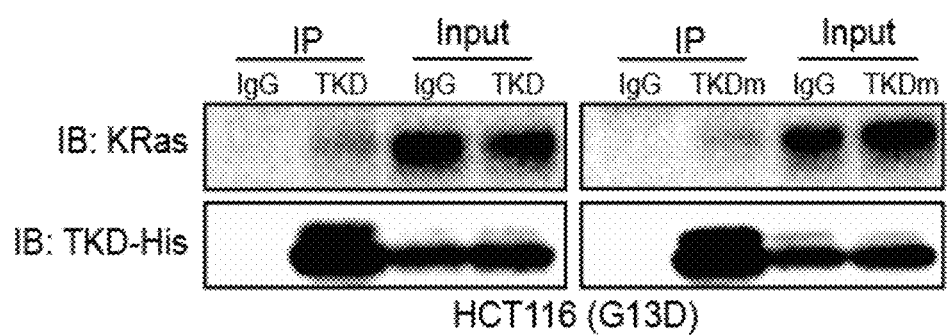
FIG. 10B is a graph showing the binding levels of the TKD molecule and the TKDm molecule to the KRas protein in the HCT116 (KRas G13D) cells.

Results were shown in FIG. 10A and FIG. 10B. The co-precipitation (Co-IP) experiment indicated that: the TKD molecule could pass through the cell membrane and bind to the wild-type and mutant-type KRas proteins in cells without discrimination.

III. Verification of Degradation Effect of the KKD Molecule Targeting KRas on the Wild-Type and Mutant-Type KRas Proteins In this embodiment, it was verified that the degradation of the wild-type and mutant-type KRas proteins by the TKD molecule was time-dependent and concentration-dependent. The degradation effect of the TKD molecule on KRas was mainly detected by a western blot (WB) method, and specific steps were as follows.

1. Concentration-Dependency of KRas Protein Degradation by TKD and TKDm Molecules
   (1) Source and culture of cells: human colorectal cancer cells HT29 (KRas wt) and human colorectal cancer cells HCT116 (KRas G13D) came from American Type Culture Collection (ATCC) (item number: HTB-38, CCL-247). HT29 and HCT116 cells were all cultured in the 1640 culture medium added with 10% fetal bovine serum (FBS), under 5% $CO_2$ at 37° C.
   (2) The colorectal cancer cells HCT116 and HT29 were respectively spread in six-well plates, 500,000 cells per well. Each of HCT116 and HT29 was divided into two groups, in the experimental groups, TKD was added into culture wells respectively to make final concentrations be 0 µg/ml, 0.01 µg/ml, 0.1 µg/ml, 1 µg/ml, 10 µg/ml and 20 µg/ml in sequence (the solution with the concentration of 0 was prepared by the equal volume of PBS), while in the control groups, TKDm was used instead of TKD for the same processing. 2,000 µL of DMEM complete culture solution was added into each well and mixed evenly, and the cells were cultured at 37° C. for 24 hours.
   (3) The cells were cleaned with PBS twice, and 0.5 mL of 0.25% pancreatin was added into each well to digest the cells and make the cells fall off from the culture dish wall. Then, the digestion was stopped with 1 mL of complete culture solution per well, the cell suspension was collected into a 1.5 mL EP tube, and centrifuged at the room temperature and 300 g for 3 minutes to collect the cells. The cells were resuspended with 1 mL of PBS, and repeatedly centrifuged for one time.
   (4) The supernatant was removed, and 100 µL of lysate was added in each group (item number: P0013G; purchased from Beyotime Biotechnology Company). The cells were lysed on ice, vortically vibrated every 5 minutes, and centrifuged at 4° C. and 12,000 pm for 30 minutes after being lysed for 30 minutes, and the supernatant was collected into a new 1.5 mL EP tube.
   (5) The protein concentration was measured by the BCA method, and 30 µg of protein was taken from each group for SDS denaturation gel electrophoresis, transferred and blocked with 5% skim milk for 1 hour. Then, KRas (source: Proteintech; item number: 12063-1-AP) and β-tublin (source: Proteintech; item number: 10094-1-AP) primary antibodies were added by a ratio of 1:2,000, and shaken overnight at 4° C. to remove the antibodies. The membrane was washed with TBST for three times, 10 minutes each time. The rabbit secondary antibody labeled with corresponding HRP (source: TransGen Company; item number: HS101-01) was added for dilution with the ratio of 1:3,000 and incubated in shaking at the room temperature for 1 hour, and the membrane was cleaned with TBST for three times, 10 minutes each time. The antibody was luminously developed in the dark room of the ELC luminescent kit. Concentrations of all the primary antibodies were 1:2,000 (1 µg of protein diluted in 2,000 µL of primary antibody diluent).

Figure 11:
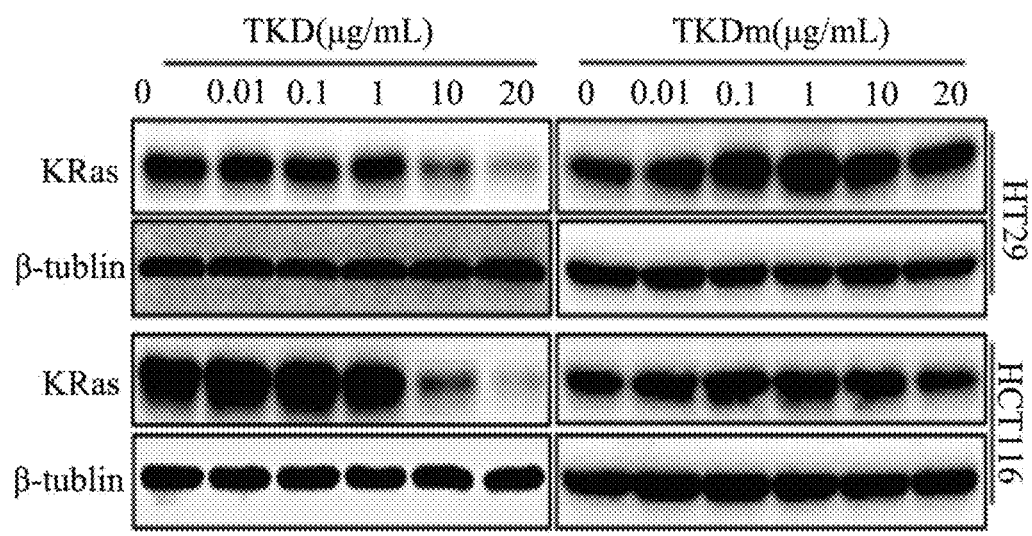
FIG. 11 is a graph showing the result of degrading the KRas protein with TKD molecules and TKDm molecules with different concentrations.

Results were shown in FIG. 11. TKD could cause degradation of expression levels of the wild-type and mutant-type KRas proteins in the colorectal cancer cells, and the degradation degree was increased with the increase of the concentration, while the control molecule TKDm incapable of being recognized by the lysosome could not play a similar role. It was indicated that the TKD molecule could induce lysosome-mediated protein degradation of intracellular proteins.

2. Influence of Administration Time of TKD and TKDm molecules on degradation of KRas
   (1) As shown in FIG. 11, when the concentrations of TKD were 10 ug/mL and 20 ug/mL, the degradation effect on KRas was obvious. Therefore, time points of 1 hour, 2 hours, 6 hours, 12 hours and 24 hours were selected to continuously detect the degradation effect on KRas under the concentrations of 0 µg/mL, 10 µg/mL and 20 µg/mL.
   (2) The cells treated at different time points were collected according to the operation in the above concentration-dependency detection, and lysed in time. The protein concentrations were measured by BCA, and 30 µg of protein was taken respectively and stored in a refrigerator at −20° C. for later use.
   (3) Western blot experiment was carried out on collected protein samples.

Figure 12:
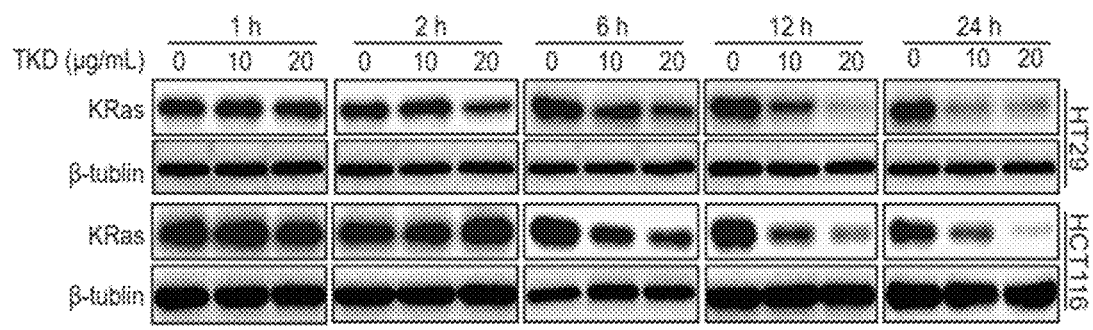
FIG. 12 is a graph showing the result of degrading the KRas protein with the TKD molecules with different concentrations at different times.

Results were shown in FIG. 12. TKD could rapidly degrade KRas, and the degradation was time-dependent within a certain range.

3. The TKD Molecule could Degrade a Variety of Mutated KRas Proteins.

Then, several common KRas site-mutated cancer cells were used to verify the effect of the TKD molecule. Cell lines used in this embodiment were SW1116 (KRas G12D), SW480 (KRas G12V) and H358 (KRas G12C), all of which came from ATCC and have item numbers of CCL-233, CCL-228 and CRL-5800 respectively. The treatment process of each cell was consistent with that described in the influence of administration time on degradation of KRas above. The Western blot experiment was carried out on the collected protein samples to verify the degradation effect of the TKD molecule on the KRas protein.

Figure 13:
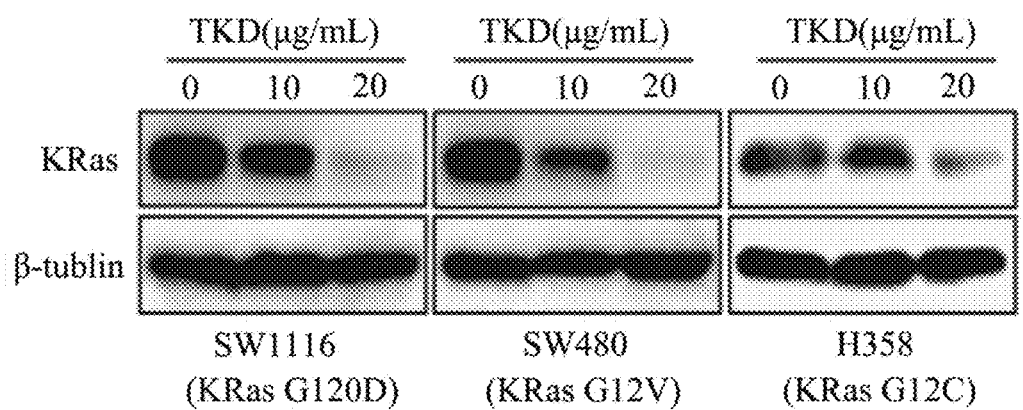
FIG. 13 is a graph showing degradation effects of the TKD molecules with different concentrations on KRas proteins mutated at different sites.

Results were shown in FIG. 13. The TKD molecule could induce the degradation of the KRas proteins in different mutation states, and the degradation effect was remarkable. It was indicated that the TKD molecule could degrade the target proteins in different mutation states indiscriminately, and had a wider application range and a better effect than the traditional small molecule targeted drug.

IV. TKD Tumor Cell Targeting Verification

The TKD molecules were labeled with fluorescent dye Cy5 to form TKD-Cy5 covalent conjugates, and then normal colorectal epithelial cells and colorectal cancer cells were treated by the coupling molecules, respectively. The flow cytometer was used to detect the concentration degree of the TKD molecule in various cells. Meanwhile, the tumor targeting in vivo evaluation was conducted on the mice, to prove the tumor cell targeting of TKD molecule.

1. Water-soluble Cy5 NHSester-Labeled TKD Molecule
   (1) 1.0 mg of Cy5 NHS was dissolved in 400 µL of DMSO, and then added into a glass bottle containing 400 µL of TKD protein solution (1.0 mg).
   (2) 15 µL of triethylamine was added, and the reaction mixture was stirred overnight at the room temperature in the dark.
   (3) The protein was purified by HPLC. Wherein, the protein C18 column (25 cm×10 mm) was used, with sample injection of 2×400 µL each time, and gradient elution was carried out for 30 minutes, 0.1% TFA (trifluoroacetic acid) solution to MeCN (acetonitrile): $H_2O$ (0.1% TFA)=70:30, and a flow rate was 4 mL/min.
   (4) Target color tape peaks were collected, and the retention time of a labeled polypeptide was longer than that of an unlabeled polypeptide.

(5) The TKD-Cy5 molecule was diluted to 60 μM, and stored in a PBS solution, and kept in the dark at −20° C.

2. Verification of Tumor Cell Targeting of TKD Molecule by Flow Cytometry (1) The colorectal cancer cell lines HCT116 and HT29, and the normal intestinal epithelial cells FHC (purchased from ATCC, item number: CRL-1831) were inoculated in 6-well plates at a density of $4\times10^5$ cells per well, and cultured overnight. The cells were treated with corresponding drugs, namely, in the experimental groups, the cells were treated with 60 nM TKD-Cy5 coupling molecule, and in the control groups, the cells were treated with the Cy5 single molecule with corresponding concentration. The lysosome inhibitor Lys 05 with the final concentration of 10 μM was added into the control groups and the experimental groups at the same time, and the final volume of the culture solution in each well was 1 mL. The cells were incubated at 37° C. under 5% $CO_2$ in the dark for 1 hour.

(2) The cells were collected by pancreatin digestion, and centrifuged at 1,500 rpm for 5 minutes, and the supernatant was removed. The cells were resuspended with the PBS buffer solution, and centrifuged again, and the supernatant was discarded. The operation was repeated for three times. Finally, the cleaned cells were resuspended in 0.2 mL of PBS, wrapped with foil paper, and then analyzed on the flow cytometer (company: BECKMAN COULTER; model: Cytoflex), with the fluorescence channel of APC-A.

Figure 14A:
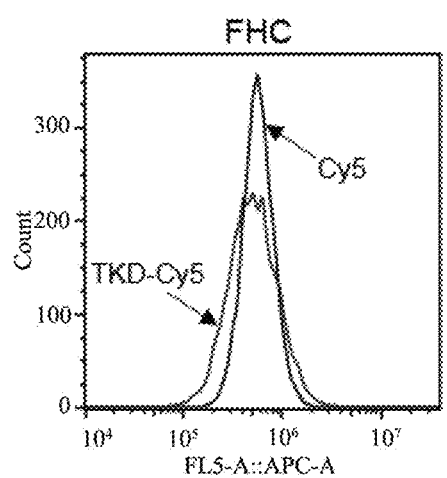
FIG. 14A is a graph of flow cytometry after the TKD molecule is treated with the normal intestinal epithelial cells FHC.
Figure 14B:
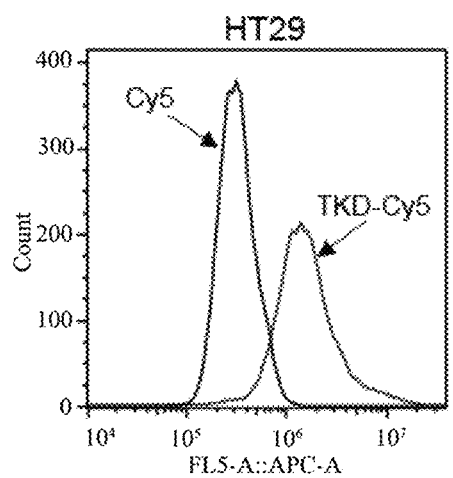
FIG. 14B is a graph of flow cytometry after the TKD molecule is treated with HT29 cells.
Figure 14C:
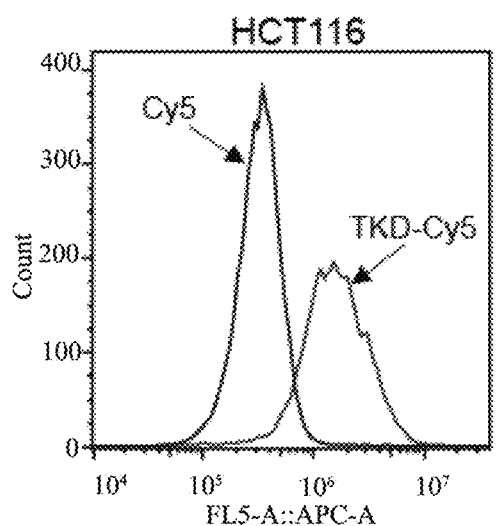
FIG. 14C is a graph of flow cytometry after the TKD molecule is treated with HCT116 cells.

Results were shown in FIG. 14A, FIG. 14B and FIG. 14C. The flow cytometer analysis indicated that the TKD molecule could specifically recognize and pass through the cell membrane to enter the colorectal cancer cells, but could not enter the normal colorectal epithelial cells, thus indicating that the TKD molecule had strong tumor targeting.

3. The in-Vivo Experiment on Mice Proved that the TKD Molecule had Tumor Targeting in Vivo.

(1) 10 female Balb/c nude mice aged 4 weeks to 5 weeks (Guangdong Laboratory Animal Center) were purchased, and then 500,000 HT29cells and 500,000 HCT116 cells were subcutaneously injected into left and right sides of the mice respectively. One week later, the mice were divided into two groups, with five mice in each group, which were the experimental group and the control group respectively. Raising and experiment of the mice were both carried out in the Laboratory Animal Center of Sun Yat-sen University, and all the operations were in accordance with the management method of laboratory animals of Sun Yat-sen University and complied with the animal ethical rules.

(2) The TKD-Cy5 molecule and the Cy5 single molecule constructed above were injected into the mice by tail vein at a concentration of 60 μM and a volume of 100 μL, wherein the TKD-Cy5 injection group was the experimental group and the Cy5 single molecule injection group was the control group.

(3) After 2.5 hours of tail vein injection, the mice were anesthetized with isoflurane. Cy5 imaging detection was conducted by using IVIS Lumina (PerkinElmer), with a fluorescence detection form of fluorescence.

Figure 15:
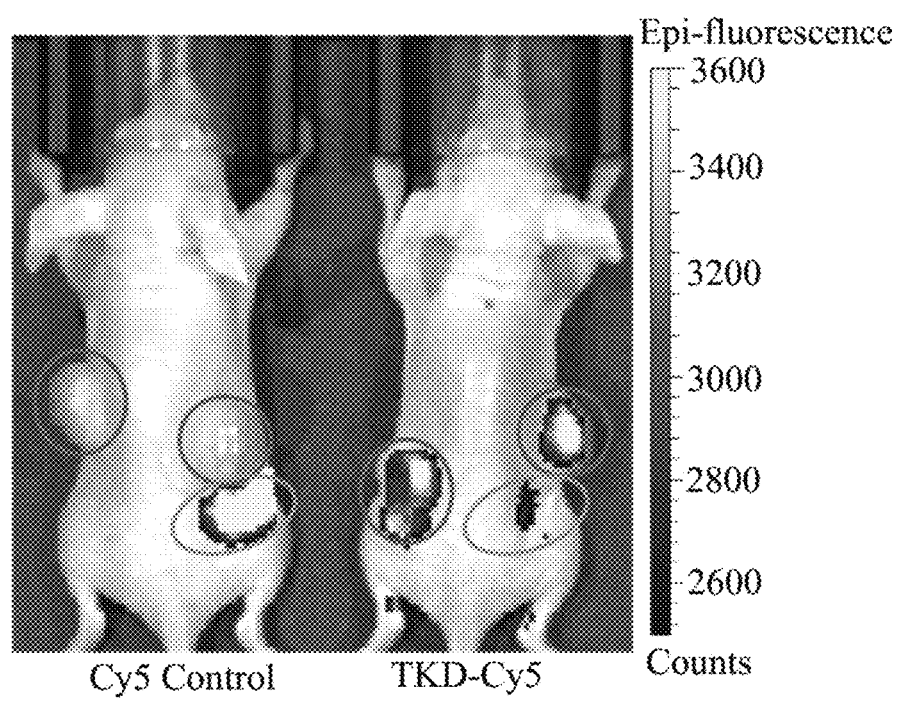
FIG. 15 is a graph showing aggregation of the TKD molecules in tumors derived from KRas wild-type HT29 cells and KRas mutant-type HCT116 cells.

(4) Experimental results were shown in FIG. 15. Compared with the Cy5 single molecule control group, TKD-Cy5 could aggregate in tumors derived from the KRas wild-type cells HT29 and the KRas mutant-type HCT116 cells, and except bladder retention caused by metabolism in vivo as in the control group, TKD-Cy5 could not target other tissues and organs of the mice. The above results indicated that TKD had good tumor targeting.

V. Verification of Effect of TKD on Inhibiting Proliferation of Colorectal Cancer Cells The fact that the TKD molecule could inhibit the proliferation of the colorectal cancer could be proved by the CCK-8 cell proliferation experiment, the clone formation experiment and the in-vivo tumor formation experiment on mice.

1. CCK-8 Experiment

CCK-8 was a highly sensitive and non-radioactive colorimetric method for determining the number of living cells in the cell proliferation or toxicity test. The main reagent WST-8 was oxidized and reduced by the intracellular dehydrogenase to produce the orange-yellow formazan dye capable of being dissolved in the culture medium, and the amount of formazan produced was proportional to the number of living cells.

(1) The colorectal cancer cells HCT116 and HT29 in the logarithmic growth phase were respectively digested with 0.25% pancreatin, counted and inoculated in a 96-well culture plate. Each of the colorectal cancer cells HCT116 and HT29 was divided into six groups, with four auxiliary wells in each group, and 100 μL of cell suspension with a concentration of $1\times10^4$ cells/mL was added into each well. Meanwhile, 100 μL of phosphate buffer solution (PBS) was added around the 96-well cell culture plate to prevent volatilization of the cell culture solution. The cells were cultured in an incubator at 37° C. under 5% $CO_2$ for 24 hours to implement adhesion of the cells.

(2) After rinsing with PBS for three times, the cells were continuously cultured with the replaced culture medium containing different concentrations of TKD and TKDm (0 μg/mL, 10 μg/mL, and 20 μg/mL) for 24 hours, then the culture solution was discarded, and the cells were rinsed with PBS for three times. 100 μL of CCK-8 diluent (CCK-8: culture medium=1:10) was evenly added, and incubated at 37° C. under 5% $CO_2$ for 2 hours, and then the corresponding OD value at 450 nm wavelength was measured by an enzyme-linked immunosorbent assay instrument.

(3) Statistical analysis was carried out by using GraphPad Prism8 software, and one way anova was used to compare means of multiple groups. The difference was statistically significant when $P<0.05$.

Figure 16A:
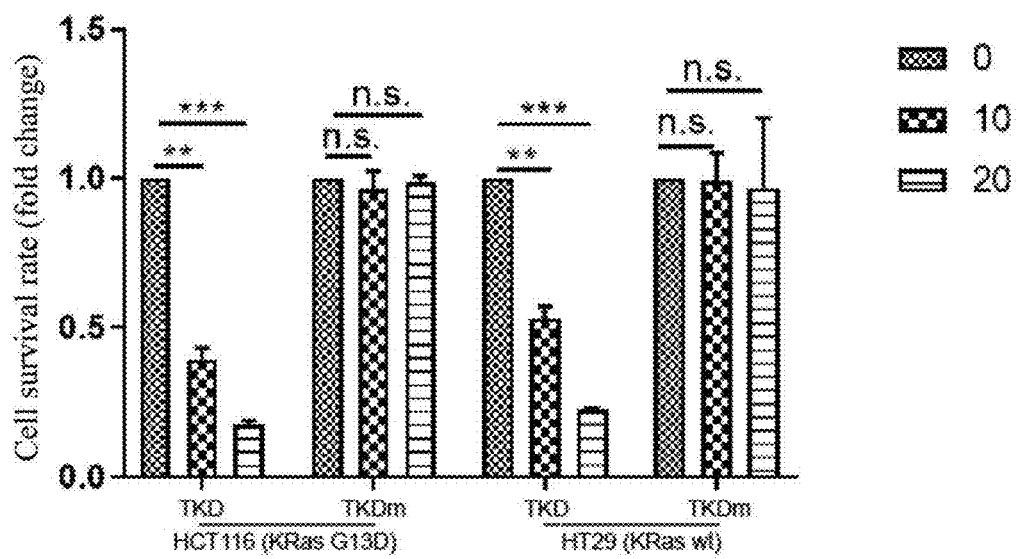
FIG. 16A is a graph of showing the inhibition of TMD molecules and TKDm molecules with different concentrations on HT29 (KRas wt) and HCT116 (KRas G13D)

Results were shown in FIG. 16A. The CCK-8 cell proliferation experiment indicated that TKD could significantly inhibit growth of HT29 (KRas wt) and HCT116 (KRas G13D), while TKDm could not achieve the same effect, thus indicating that TKD inhibited the proliferation of the colorectal cancer cells through lysosome-mediated KRas protein degradation, rather than the blocking effect of nanobody on the activity of KRas protein.

2. Cell Clone Formation Experiment (1) The colorectal cancer cells HT29 and HCT116 in the logarithmic growth phase were digested with pancreatin and then prepared into a single cell suspension, and the cells were evenly inoculated in a 12-well plate by 500 cells per well. Each of the colorectal cancer cells HT29 and HCT116 was divided into six groups, with three auxiliary wells in each group, and cultured in an incubator at 37° C. under 5% $CO_2$ for 24 hours to implement adhesion of the cells.

(2) The cells of each group were treated by their own experiments, that was, the cells were continuously cultured in culture medium containing different concentrations of TKD and TKDm (0 μg/mL, 10 μg/mL, and 20 μg/mL), and growth of the cells was observed every day. Cell culture solution was replaced every 1-2 days, and the culture was stopped until cell clones (more than 50 cells were considered as one clone) were seen under a light microscope.

(3) After the supernatant of each group was discarded, the cells were washed twice with the PBS buffer solution, and dried in air. A proper amount of methanol stationary liquid was added into each well for cell fixation for 15 minutes, and residual stationary liquid in the well was washed off with PBS solution, and dried in air. A proper amount of crystal violet staining solution was added into each well for cell staining for 15 minutes, and residual staining solution in the well was washed off with PBS solution, and dried in air. The cell clones seen in the auxiliary wells of each group were counted under an inverted microscope and the number of the clones was calculated.

(4) Statistical analysis was carried out by using GraphPad Prism8 software, and one way anova was used to compare means of multiple groups. The difference was statistically significant when $P<0.05$.

Figure 16B:
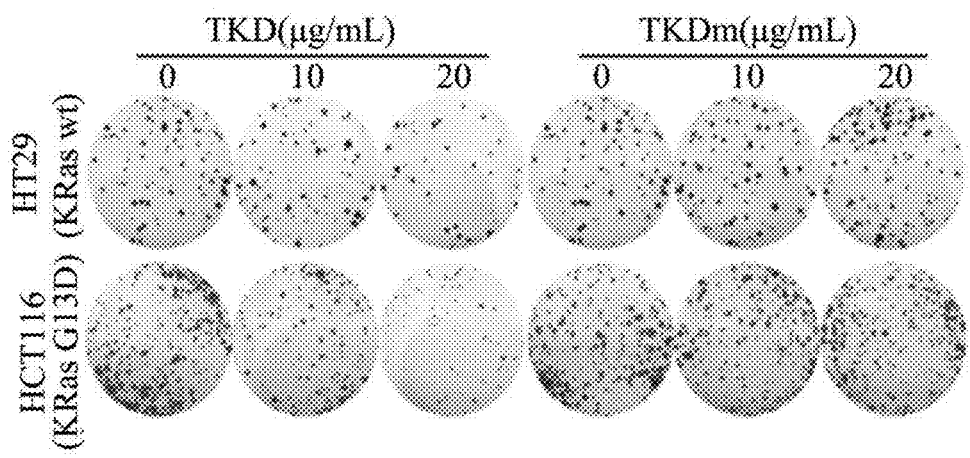
FIG. 16B is a graph showing the inhibition of TMD molecules and TKDm molecules with different concentrations on clone growth of HT29 (KRas wt) and HCT116 (KRas G13D), wherein  represents that $P<0.01$; *represents that $P<0.001$; and ns represents that there is no significant difference.
Figure 17A:
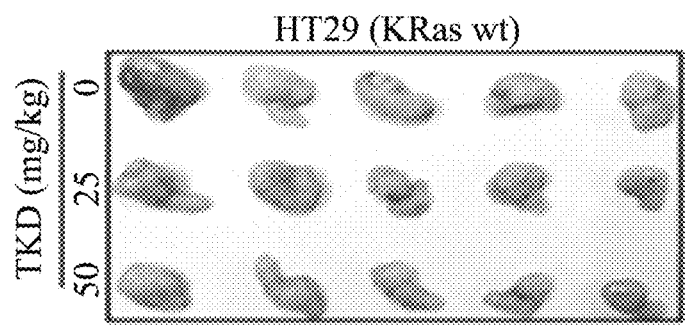
FIG. 17A is a pictorial diagram showing the influence of the TKD molecule on growth of the KRas wild-type (HT29) colorectal cancer.
Figure 17B:
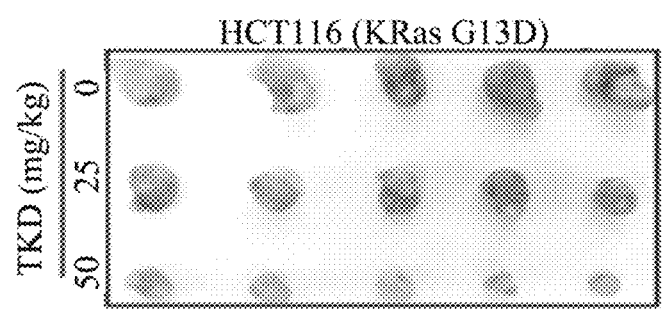
FIG. 17B is a pictorial diagram showing the influence of the TKD molecule on growth of the KRas mutant-type (HCT116) colorectal cancer.
Figure 17C:
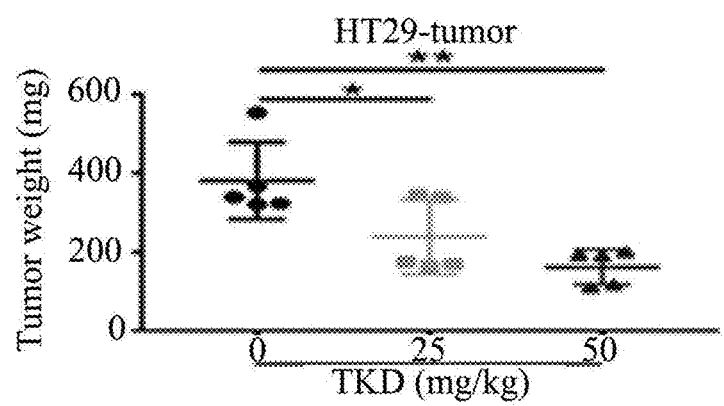
FIG. 17C is a statistical result graph of the influence of the TKD molecule on growth of the KRas wild-type (HT29) colorectal cancer.
Figure 17D:
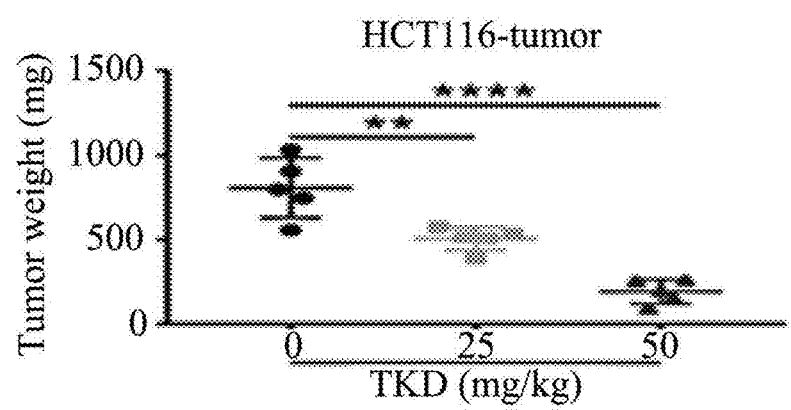
FIG. 17D is a statistical result graph of the influence of the TKD molecule on growth of the KRas mutant-type (HCT116) colorectal cancer, wherein ** represents that $P<0.0001$; represents that $P<0.01$; and *represents that $P<0.05$.

Results were shown in FIG. 16 B. The clone formation experiment indicated in a cell level that the TKD molecule could significantly inhibit the growth of the KRas wild-type and mutant-type (G13D) colorectal cancer cell clones.

The CCK-8 and clone formation experiments above both proved that compared with the control group TKDm, TKD could significantly inhibit the proliferation of the KRas wild-type and mutant-type colorectal cancer cells, thus indicating that the nanobody-mediated KRas degradation system TKD degraded the target protein through a lysosome pathway, and was of great value for treatment of the colorectal cancer.

3. In-Vivo Tumor Formation Experiment (1) Balb/c nude mice, female, 4 weeks to 5 weeks old, purchased from Guangdong Laboratory Animal Center and raised in Laboratory Animal Center of Sun Yat-sen University, were used in this experiment. The experimental mice were divided into three groups, with five mice in each group, which were respectively a phosphate buffer solution (PBS) control group, a TKD-25 mg/kg group and a TKD-50 mg/kg group.

(2) The HT29 and HCT116 cells in the logarithmic phase were digested with pancreatin, the digestion was stopped with the complete culture solution, and then the cells were counted. After counting, 7.5 million HT29 and HCT116 cells were taken respectively, washed twice with PBS, centrifuged at 300 g for 5 minutes after fishing each washing, and collected.

(3) The cell dilution buffer solution having the composition of PBS: matrix glue (Corning Company)=1:1 was prepared to resuspend the cells. The HT29 and HCT116 cells were resuspended with 1.5 mL of buffer solution respectively, and put on ice for later use.

(4) The subcutaneous tumor formation experiment was carried out: each mouse was anesthetized by intraperitoneal injection of 150 μL of tribromoethanol, and then 100 μL (500,000 cells) of HT29 cell suspension and 100 μL (500,000 cells) of HCT116 cell suspension were injected subcutaneously into left and right sides of back of the mouse respectively, wherein the HT29 cells were injected into the left side and the HCT116 cells were injected into the right side.

(5) After the mice were raised for one week, the administration experiment was started: the administration mode was intraperitoneal injection, wherein PBS was injected in the PBS control group, TKD with a concentration of 25 mg/kg was injected in the TKD-25 mg/kg group, and TKD with a concentration of 50 mg/kg was injected in the TKD-50 mg/kg group. In the experiment, the administration volume was 150 μL, the administration frequency was once every three days at a fixed time, and the administration was continued for seven times.

(6) After the administration, each mouse was injected with 150 μL of tribromoethanol, and then killed by cervical dislocation. Tumors on the left and right sides of the mouse were respectively collected and weighed to calculate the weight of tumors. Experimental results were shown in FIG. 17A, FIG. 17B, FIG. 17C and FIG. 17D. Compared with the PBS control group, the TKD administration group could significantly inhibit the growth of the KRas wild-type (HT29) and mutant-type (HCT116) colorectal cancer, and the TKD-50 mg/kg group with a high concentration had a better effect than the TKD-25 mg/kg group with a low concentration. It was indicated that TKD could also effectively inhibit tumor growth in vivo.

VI. Verification of Toxic and Side Effects of TKD Molecule (1) Balb/c nude mice, female, 4 weeks to 5 weeks old, purchased from Guangdong Laboratory Animal Center and raised in Laboratory Animal Center of Sun Yat-sen University, were used in this experiment. The experimental mice were divided into three groups, with five mice in each group, which were respectively a phosphate buffer solution (PBS) control group, a TKD-25 mg/kg group and a TKD-50 mg/kg group.

(2) The mice were administered with PBS and TKD solutions by intraperitoneal injection, each administration volume was 150 μL, and TKD was administered according to 25 mg/kg and 50 mg/kg respectively. The mice were administered once every three days at a fixed time. Meanwhile, changes in body state, mental state and weight of the mice were observed and recorded.

(3) After continuous administration for seven times (3 weeks), the mice were euthanized (killed by cervical dislocation). The main organs including lung, liver, spleen and kidney of the mice were stained with hematoxylin-eosin (HE) and analyzed by histopathology, so as to evaluate toxic and side effects of TKD on the body. All the animal experiments were carried out within relevant regulations of animal ethics of Sun Yat-sen University.

Figure 18A:
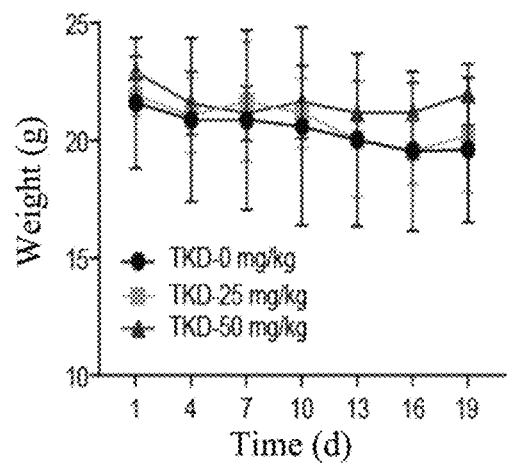
FIG. 18A is a graph showing the influence of the TKD molecule on the weight of the mouse.
Figure 18B:
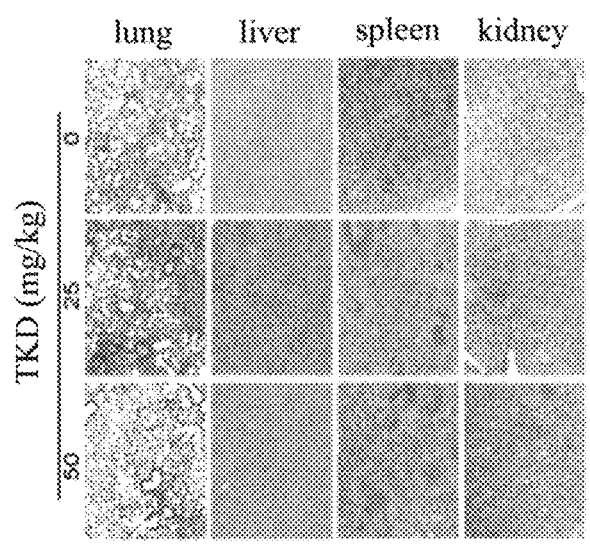
FIG. 18 B is a graph showing the influence of the TKD molecule on lung, liver, spleen and kidney of the mouse.

Experimental results were shown in FIG. 18A and FIG. 18B. Compared with the control PBS administration group, the mice in the two TKD administration groups did not show obvious changes in body weight. Pathological analysis indicated that the TKD molecule did not damage vital organs including lung, liver, spleen and kidney of the mice. The data above all proved that the TKD molecule had less toxic and side effects on the body, and had an important clinical application value.

VII. Verification of Residence Time of TKD Molecule in Vivo (1) Balb/c nude mice, female, 4 weeks to 5 weeks old, purchased from Guangdong Laboratory Animal Center and raised in Laboratory Animal Center of Sun Yat-sen University, were used in this experiment. The experimental mice were divided into three groups, with five mice in each group, which were respectively a phosphate buffer solution (PBS) control group, a TKD-25 mg/kg group and a TKD-50 mg/kg group.

(2) The mice were administered with PBS and TKD solutions by intraperitoneal injection, each administration volume was 150 μL, and TKD was administered once according to 25 mg/kg and 50 mg/kg respectively.

(3) The mice were euthanized (killed by cervical dislocation) after administration for 3 days, and fresh blood was extracted from hearts of the mice, and centrifuged to collect serum. The serum protein concentration was measured by the BCA method (as described above). 20 μg of serum protein was respectively taken for the WB experiment (as described above), and whole serum protein gel running and Coomassie brilliant blue staining.

Figure 19:
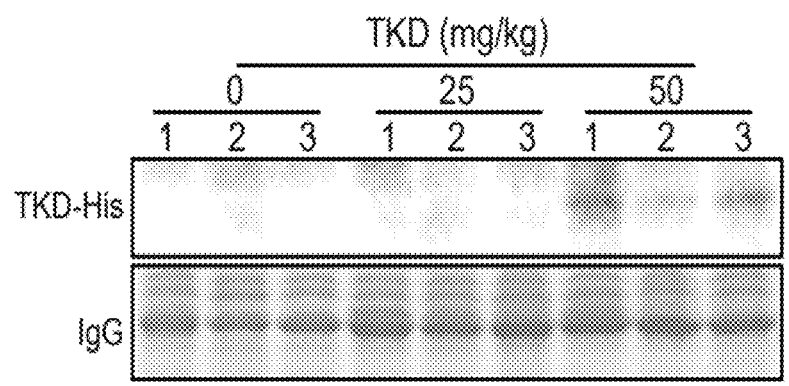
FIG. 19 is a graph showing the the residence time of the TKD molecule in vivo.

(4) Experimental results were shown in FIG. 19. The high concentration TKD administration group could still be detected (50 mg/kg) after administration for 3 days, which indicated that the half-life period of the TKD molecule in vivo was long, and had an important clinical application value.

EXAMPLE 2 VERIFICATION OF EFFECT OF TKD ON REVERSING GEFITINIB RESISTANCE OF COLORECTAL CANCER CELLS

In Embodiment 1, the design idea of TKD is explained, the function of TKD in inducing the degradation of the wild-type and mutant-type KRas proteins is verified, and the tumor targeting of TKD and the effect of TKD on inhibiting the proliferation of the colorectal cancer are further verified. Since the KRas protein is an important effector molecule in the EGFR downstream signal pathway, KRas mutation often leads to clinical drug resistance of the colorectal cancer cells to the EGFR-targeted drug such as gefitinib. Therefore, in this embodiment, the expression level of KRas in the colorectal cancer cells is reduced by the way of TKD-induced degradation of the KRas protein, and the effect of this way on restoring the gefitinib sensitivity of the colorectal cancer cells is evaluated.

I. Verification of Effect of KRas Mutation on Leading to Gefitinib Resistance of Colorectal Cancer Cells EGFR mainly promoted tumor occurrence and development by activating two signal pathways, which were respectively EGFR/KRas/Raf/ERK and EGFR/PI3K/AKT. KRas mutation could usually lead to continuous activation of the KRas/Raf/ERK signal pathway, therefore, the effect of the EGFR-targeted drug could be counteracted or even weakened. In this embodiment, taking the EGFR-targeted drug gefitinib as an example, and taking the KRas wild-type cells HT29 (KRaswt) and the KRas mutant-type cells HCT116 (KRas G13D) as objects, the effect of the KRas mutation on drug resistance of the colorectal cancer cells was explored.

1. The CCK-8 Experiment Proved that the KRas Mutant-Type Cells HCT116 (KRas G13D) had Gefitinib Resistance (1) The colorectal cancer cells HCT116 and HT29 in the logarithmic growth phase and the normal human intestinal epithelial cells FHC as control were respectively digested with 0.25% pancreatin, counted and inoculated in a 96-well culture plate. Each of the colorectal cancer cells HCT116 and HT29 and the human intestinal epithelial cell FHC was divided into six groups, with four auxiliary wells in each group, and 100 μL of cell suspension with a concentration of $1 \times 10^4$ cells/mL was added into each well,. Meanwhile, 100 μL of phosphate buffer solution (PBS) was added around the 96-well cell culture plate to prevent volatilization of the cell culture solution. The cells were cultured in an incubator at 37° C. under 5% $CO_2$ for 24 hours to implement adhesion of the cells.

(2) After rinsing with PBS for three times, the cells were continuously cultured with the replaced culture medium containing different concentrations of gefitinib (0 μM, 1 μM, 2 μM, 4 μM, 6 μM, and 8 μM) for 24 hours (the solution with the concentration of 0 μM was replaced by the equal volume of dimethyl sulfoxide DMSO), then the culture solution was discarded, and the cells were rinsed with PBS for three times. 100 μL of CCK-8 diluent (CCK-8: culture medium=1:10) was evenly added, and incubated at 37° C. under 5% $CO_2$ for 2 hours, and then the corresponding OD value at 450 nm wavelength was measured by an enzyme-linked immunosorbent assay instrument.

(3) Statistical analysis was carried out by using GraphPad Prism8 software, and one way anova was used to compare means of multiple groups. The difference was statistically significant when P<0.05.

Figure 20:
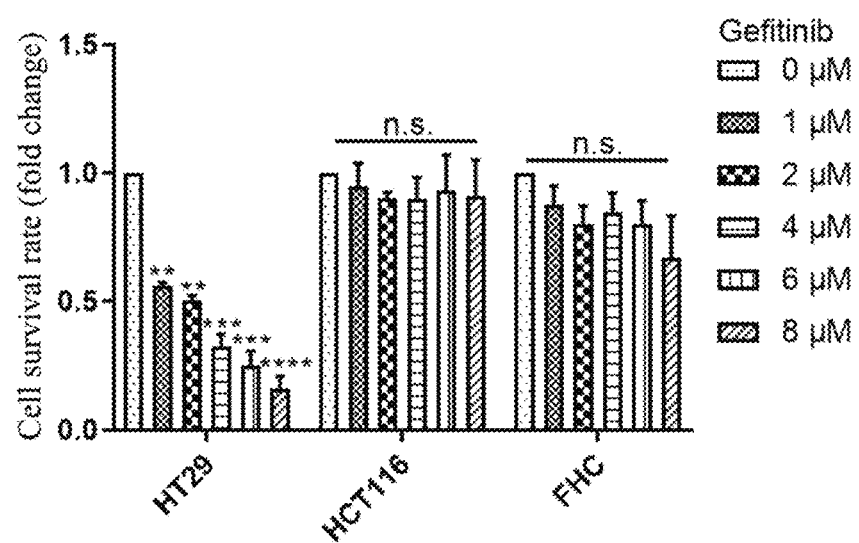
FIG. 20 is a graph showing the influence of gefitinib on the cell viability of the colorectal cancer cells HCT116 and HT29, wherein **represents that $P<0.0001$; *represents that $P<0.001$; **represents that $P<0.01$; * represents that $P<0.05$; and ns represents that there is no significant difference.

Results were shown in FIG. 20. The CCK-8 cell proliferation experiment proved that gefitinib could significantly inhibit the growth of HT29 (KRas wt), but could not inhibit the growth of HCT116 (KRas G13D).

2. The Clone Formation Experiment Proved that the KRas Mutant-Type Cells HCT116 (KRas G13D) had the Gefitinib Resistance (1) The colorectal cancer cells HT29 (KRas wt) and HCT116 (KRas G13D) in the logarithmic growth phase and the normal human intestinal epithelial cells FHC were digested with pancreatin and then prepared into a single cell suspension, and the cells were evenly inoculated in a 12-well plate by 500 cells per well. Each of the colorectal cancer cells HT29 and HCT116 and the human intestinal epithelial cell FHC was divided into six groups, with three auxiliary wells in each group, and cultured in an incubator at 37° C. under 5% $_2$ for 24 hours to implement adhesion of the cells.

(2) The cells of each group were treated by their own experiments, that was, the cells were continuously cultured in culture medium containing different concentrations of gefitinib (0 μM, 1 μM, 2 μM, 4 μM, 6 μM, and 8 μM), and growth of the cells was observed every day. Cell culture solution was replaced every other 1-2 days, and the culture was stopped until cell clones (more than 50 cells were considered as one clone) were seen under a light microscope.

(3) After the supernatant of each group was discarded, the cells were washed twice with the PBS buffer solution, and dried in air. A proper amount of methanol stationary liquid was added into each well for cell fixation for 15 minutes, and residual stationary liquid in the well was washed off with PBS solution, and dried in air. A proper amount of crystal violet staining solution was added into each well for cell staining for 15 minutes, and residual staining solution in the well was washed off with PBS solution, and dried in air. The cell clones seen in the auxiliary wells of each group were counted under an inverted microscope and the number of the clones was calculated.

(4) Statistical analysis was carried out by using GraphPad Prism8 software, and one way anova was used to compare means of multiple groups. The difference was statistically significant when P<0.05.

Figure 21:
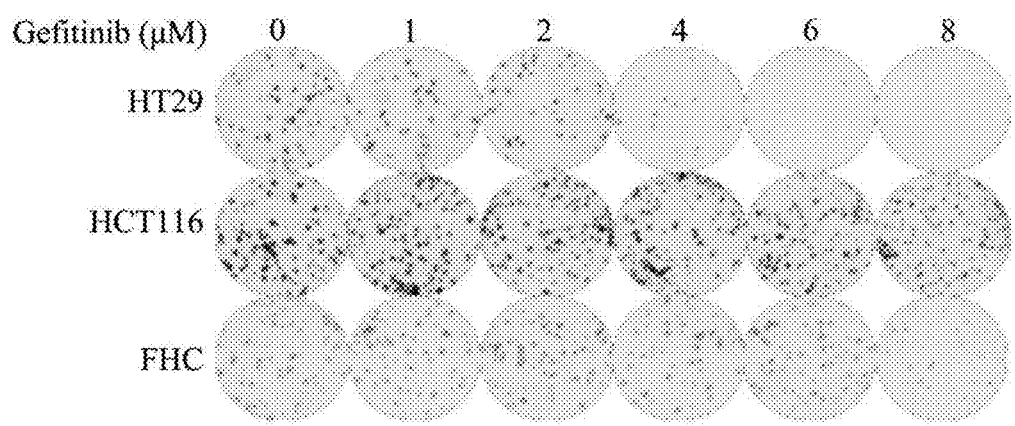
FIG. 21 is a pictorial diagram showing the influence of the gefitinib on clone growth of the colorectal cancer cells HCT116 and HT29 and the normal intestinal epithelial cells FHC.

Results were shown in FIG. 21. The clone formation experiment proved in a cell level that gefitinib could significantly inhibit the growth of the KRas wild-type cells HT29 (KRas wt), but had no significant effect on the growth of the KRas mutant-type cells HCT116 (KRas G13D).

3. The In-Vivo Tumor Formation Experiment Proved that the KRas Mutant-Type Cells HCT116 (KRas G13D) had the Gefitinib Resistance (KRas G13D) had the Gefitinib Resistance (1) Balb/c nude mice, female, 4 weeks to 5 weeks old, purchased from Guangdong Laboratory Animal Center and raised in Laboratory Animal Center of Sun Yat-sen University, were used in this experiment. The experimental mice were divided into two groups, with five mice in each group, which were respectively a phosphate buffer solution (PBS) control group and a gefitinib group.

(2) The HT29 and HCT116 cells in the logarithmic phase were digested with pancreatin, the digestion was stopped with the complete culture solution, and then the cells were counted. After counting, 5 million HT29 and HCT116 cells were taken respectively, washed twice with PBS, centrifuged at 300 g for 5 minutes after finishing each washing, and collected.

(3) The cell dilution buffer solution having the composition of PBS: matrix glue (Corning Company)=1:1 was prepared to resuspend the cells. The HT29 and HCT116 cells were resuspended with 1 mL of buffer solution respectively, and put on ice for later use.

(4) The subcutaneous tumor formation experiment was carried out: each mouse was anesthetized by intraperitoneal injection of 150 μL of tribromoethanol, and then 100 μL (500,000 cells) of HT29 cell suspension and 100 μL (500,000 cells) of HCT116 cell suspension were injected subcutaneously into left and right sides of back of the mouse respectively, wherein the HT29 cells were injected into the left side and the HCT116 cells were injected into the right side.

(5) After the mice were raised for one week, the administration experiment was started: the administration mode was intragastric administration, wherein PBS was injected in the PBS control group, and gefitinib with a concentration of 50 mg/kg was injected in the gefitinib group. The administration volume was 150 μL, the administration frequency was once every three days at a fixed time, and the administration was continued for seven times.

Figure 22A:
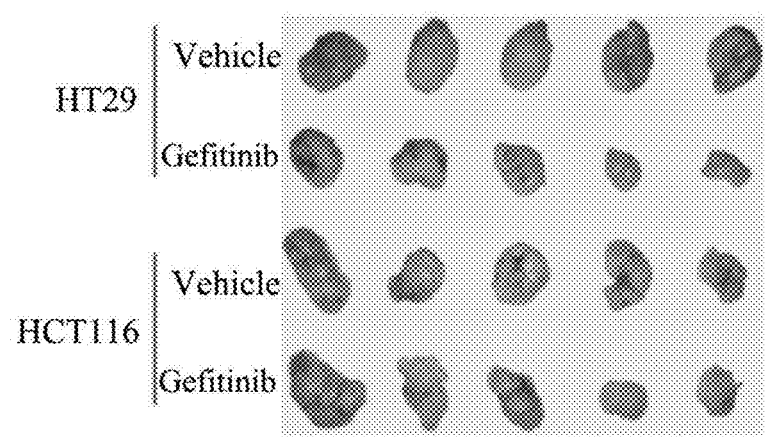
FIG. 22A is a pictorial diagram showing the influence of the gefitinib on the KRas wild-type (HT29) colorectal cancer and the KRas mutant-type (HCT116) colorectal cancer.
Figure 22B:
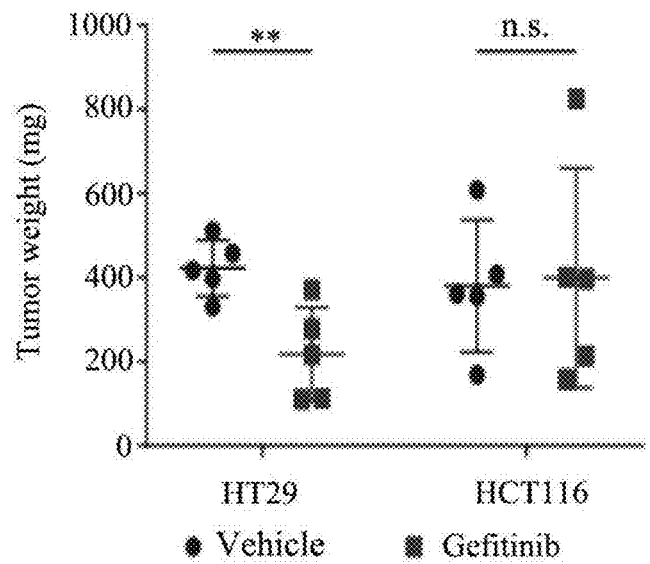
FIG. 22B is a statistical result graph showing the influence of the gefitinib on the KRas wild-type (HT29) colorectal cancer and the KRas mutant-type (HCT116) colorectal cancer, wherein ** represents that $P<0.01$; and ns represents that there is no significant difference.

(6) After the administration, each mouse was injected with 150 μL of tribromoethanol, and then killed by cervical dislocation. Tumors on the left and right sides of the mouse were respectively collected and weighed to calculate the weight of tumors. Experimental results were shown in FIG. 22A and FIG. 22B. Compared with the PBS control group, the gefitinib administration group could significantly inhibit the growth of the KRas wild-type (HT29) colorectal cancer, but had no effect on the growth of the KRas mutant-type (HCT116) colorectal cancer.

4. Gefitinib could not Inhibit the Activation of the EGFR Downstream Signal Pathway KRas/RAF/ERK/c-myc in the KRas Mutant-Type Cells (1) The colorectal cancer cells HCT116 (KRas G13D) and HT29 (KRas wt) were respectively spread in six-well plates, 500,000 cells per well. Each of HCT116 and HT29 was divided into two groups, and in the experimental groups, Gefitinib was added into culture wells respectively to make final concentrations be 0 μM and 4 μM in sequence (the solution with the concentration of 0 was prepared by the equal volume of dimethyl sulfoxide DMSO). 2,000 μL of DMEM complete culture solution was added into each well, the culture solution was mixed evenly, and the cells were cultured at 37° C. for 24 hours. The 4 μM concentration was selected because gefitinib at such concentration could not cause toxic and side effects on normal cells.

(2) The cells were cleaned with PBS twice, and 0.5 mL of 0.25% pancreatin was added into each well to digest the cells and make the cells fall off from the culture dish wall. Then, the digestion was stopped with 1 mL of complete culture solution per well, the cell suspension was collected into a 1.5 mL EP tube, and centrifuged at the room temperature and 300 g for 3 minutes to collect cells. The cells were resuspended with 1 mL of PBS, and repeatedly centrifuged once.

(3) The supernatant was removed, 100 μL of lysate was added in each group (item number: P0013G; purchased from Beyotime Biotechnology Company). The cells were lysed on ice, vortically vibrated every 5 minutes, and centrifuged at 4° C. and 12,000 rpm for 30 minutes after being lysed for 30 minutes, and the supernatant was collected in a new 1.5 mL EP tube.

(4) The protein concentration was measured by the BCA method, and 20 μg of protein was taken from each group for SDS denaturation gel electrophoresis, transferred and blocked with 5% skim milk for 1 hour. Then, β-tublin (source: Proteintech; item number: 10094-1-AP), ERK (source: GST; item number: 4695s), pEKR (source: GST; item number : 8544S), Raf (source: GST; item number: 53745s), pRaf (source: GST; item number: 9427s), c-myc (source: GST; item number: 9402s) primary antibodies were respective added by a ratio of 1:2000, and shaken overnight at 4° C. to remove the antibodies. The membrane was cleaned with TBST for three times, 10 minutes each time. The mouse or rabbit secondary antibody (source: TransGen Company; item number: HS101-01 and HS201-01) labeled with corresponding HRP was added for dilution by the ratio of 1:3000, and incubated in shaking at the room temperature for 1 hour. The membrane was cleaned with TBST for three times, 10 minutes each time. The mouse or rabbit secondary antibody was luminously developed in the dark room of the ELC luminescent kit. Concentrations of all the primary antibodies were 1:2000 (1 μg of protein diluted in 2,000 μL of primary antibody diluent).

Figure 23:
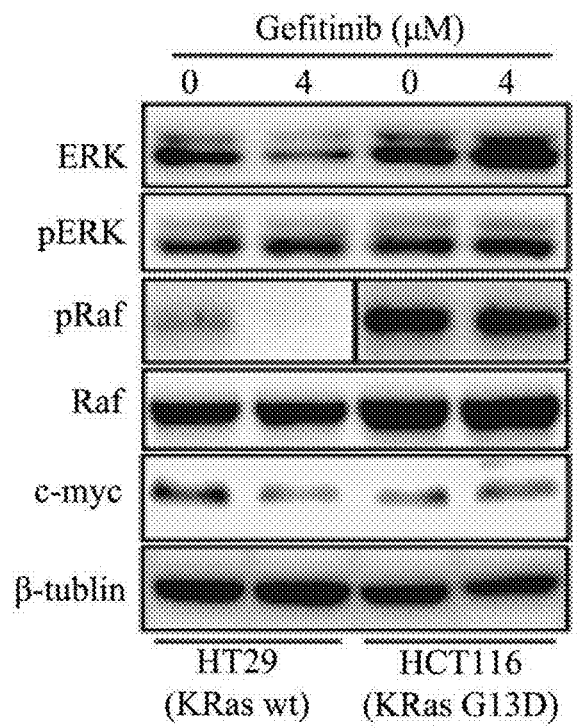
FIG. 23 is a graph showing the influence of the gefitinib on the signal pathway Raf/ERK/c-myc in the KRas wild-type cells HT29 and the KRas mutant-type cells HCT116.

(5) Results were shown in FIG. 23. Gefitinib could significantly inhibit the activation of the signal pathway Raf/ERK/c-myc in the KRas wild-type cells HT29, but could not inhibit the activation of the signal pathway Raf/ERK/c-myc in the KRas mutant-type cells HCT116.

The CCK-8 experiment, clone formation experiment, in-vivo experiment on mice and WB experiment above all proved that the KRas mutant-type colorectal cancer cells had the gefitinib resistance.

II. TKD-Induced KRas Degradation could Inhibit the Activation of the EGFR Downstream KRas/Raf/ERK/c-Myc Signal Pathway (1) The colorectal cancer cells HCT116 and HT29 were respectively spread in six-well plates, 500,000 cells per well. Each of HCT116 and HT29 was divided into two groups, in the experimental groups, TKD was added into culture wells respectively to make final concentrations be 0 μg/mL, 10 μg/mL and 20 μg/mL in sequence (the solution with the concentration of 0 was prepared by the equal volume of PBS), while in the control groups, TKDm was used instead of TKD for the same processing. 2,000 μL of DMEM complete culture solution was added into each well, and was mixed evenly, and the cells were cultured at 37° C. for 24 hours.

(2) The cells were cleaned with PBS twice, and 0.5 mL of 0.25% pancreatin was added into each well to digest the cells and make the cells fall off from the culture dish wall. Then, the digestion was stopped with 1 mL of complete culture solution per well, the cell suspension was collected into a 1.5 mL EP tube, and centrifuged at the room temperature and 300 g for 3 minutes to collect the cells. The cells were resuspended with 1 mL of PBS, and repeatedly centrifuged for one time.

(3) The supernatant was removed, and 100 μL of lysate was added in each group (item number: P0013G; purchased from Beyotime Biotechnology Company). The cells were lysed on ice, vortically vibrated every 5 minutes, and centrifuged at 4° C. and 12,000 pm for 30 minutes after being lysed for 30 minutes. The supernatant was collected into a new 1.5 mL EP tube.

(4) The protein concentration was measured by the BCA method, and 20 μg of protein was taken from each group for SDS denaturation gel electrophoresis, transferred and blocked with 5% skim milk for 1 hour. Then, KRas (source: Proteintech; item number: 12063-1-AP), β-tublin (source: Proteintech; item number: 10094-1-AP), ERK (source: GST; item number: 4695s), pEKR (source: GST; item number 8544S), Raf (source: GST; item number: 53745s), pRaf (source: GST; item number 9427s), c-myc (source: GST; item number 9402s) primary antibodies were added by the ratio of 1:2,000, and shaken overnight at 4° C. to remove the antibodies. The membrane was washed with TBST for three times, 10 minutes each time. The mouse or rabbit secondary antibody labeled with corresponding HRP (source: TransGen Company; item number: HS101-01 and HS201-01) was added for dilution by the ratio of 1:3,000 and incubated in shaking at the room temperature for 1 hour. The membrane was cleaned with TBST for three times, 10 minutes each time. The mouse or rabbit secondary antibody was luminously developed in the dark room of the ELC luminescent kit. Concentrations of all the primary antibodies were 1:2,000 (1 μg of protein diluted in 2,000 μL of primary antibody diluent).

Figure 24:
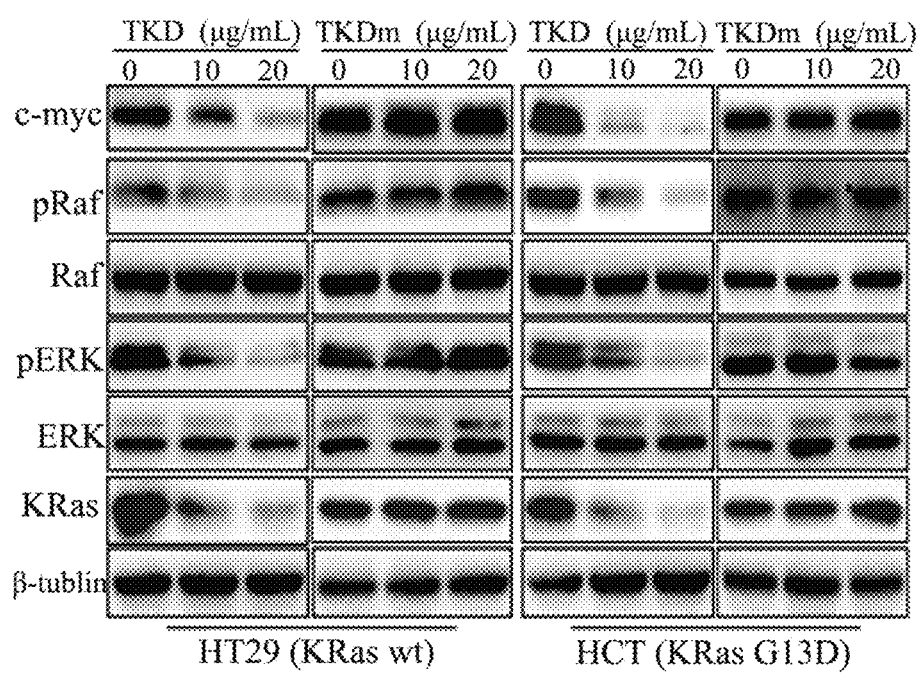
FIG. 24 is a graph showing the influences of the TMD molecule and the TKDm molecule on the EGFR downstream signal pathway KRas/RAF/ERK/c-myc in the KRas wild-type cells HT29 and the KRas mutant-type cells HCT116.
Figure 25A:
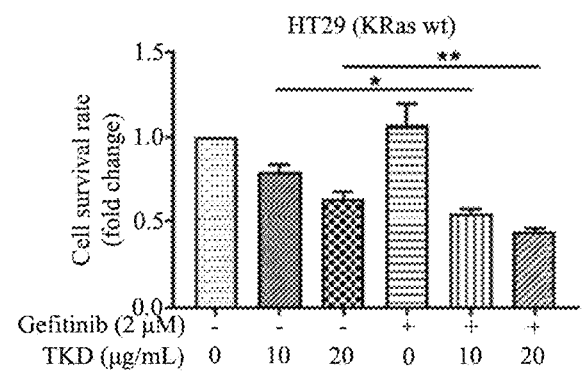
FIG. 25A is a graph showing the influence of combination use of the TMD molecule and the gefitinib on the growth of HT29 (KRas wt)
Figure 25B:
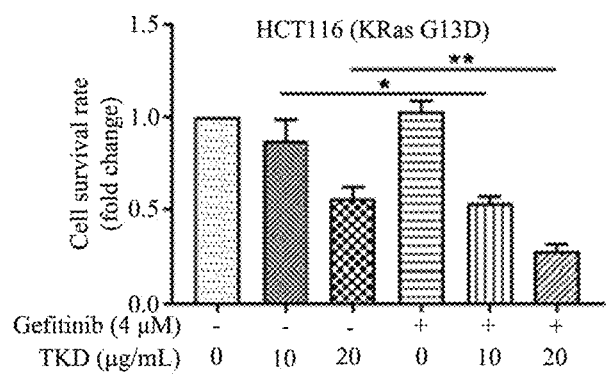
FIG. 25B is a graph showing the influence of combination use of the TMD molecule and the gefitinib on the growth of HCT116 (KRas G13D)
Figure 25C:
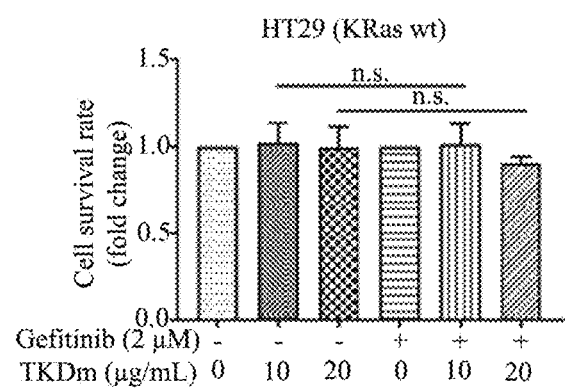
FIG. 25C is a graph showing the influence of combination use of the TKDm molecule and the gefitinib on the growth of HT29 (KRas wt)
Figure 25D:
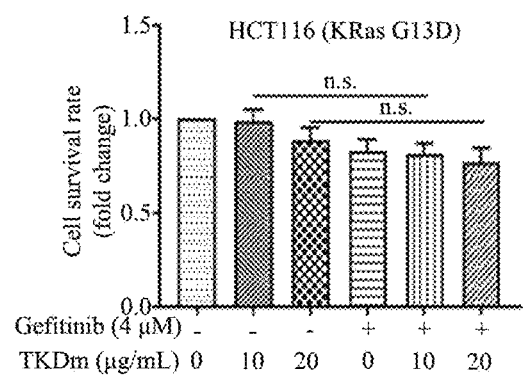
FIG. 25D is a graph showing the influence of combination use of the TKDm molecule and the gefitinib on the growth of HCT116 (KRas G13D), wherein * represents that $P<0.05$; ** represents that $P<0.01$; and ns represents that there is no significant difference.

(6) Results were shown in FIG. 24. Compared with the control group TKDm, TKD could significantly inhibit the activation of the EGFR downstream signal pathway KRas/Raf/ERK/c-myc in the KRas wild-type cells HT29 and the KRas mutant-type cells HCT116.

III. Combination of TKD and Gefitinib Enhanced the Effect of Gefitinib

1. The CCK-8 Experiment Proved that TKD could Enhance the Effect of Gefitinib (1) The colorectal cancer cells HCT116 and HT29 in the logarithmic growth phase were respectively digested with 0.25% pancreatin, counted and inoculated in a 96-well culture plate. Each of the colorectal cancer cells HCT116 and HT29 was divided into six groups, with four auxiliary wells in each group, and 100 μL of cell suspension with a concentration of $1\times10^4$ cells/mL was added into each well. Meanwhile, 100 μL of phosphate buffer solution (PBS) was added around the 96-well cell culture plate to prevent volatilization of the cell culture solution. The cells were cultured in an incubator at 37° C. under 5% $CO_2$ for 24 hours to implement adhesion of the cells.

(2) After rinsing with PBS for three times, culture medium containing TKD and TKDm (which respectively had final concentrations of 0 μg/mL, 10 μg/mL and 20 μg/mL) and gefitinib were added respectively to continuously culture the cells for 24 hours (the solution with the concentration of 0 μM was prepared by the equal volume of dimethyl sulfoxide DMSO), then the culture solution was discarded, and the cells were rinsed with PBS for three times. 100 μL of CCK-8 diluent (CCK-8: culture medium=1:10) was evenly added, and incubated at 37° C. under 5% $CO_2$ for 2 hours, and then the corresponding OD value at 450 nm wavelength was measured by an enzyme-linked immunosorbent assay instrument. In this experiment, in order to verify the effect of TKD on restoring the sensitivity of the colorectal cancer cells to gefitinib, the cells were all treated with low-concentration gefitinib, wherein the KRas wild-type cells HT29 was treated with 2 μM gefitinib, and the KRas mutant-type cells HCT116 was treated with 4 μM gefitinib.

(3) Statistical analysis was carried out by using GraphPad Prism8 software, and one way anova was used to compare means of multiple groups. The difference was statistically significant when $P<0.05$.

Results were shown in FIG. 25A, FIG. 25B, FIG. 25C and FIG. 25D. The CCK-8 cell proliferation experiment proved that combination of TKD and gefitinib could significantly inhibit the growth of HT29 (KRas wt) and HCT116 (KRas G13D), and the effect was better than that of any drug alone.

2. The Clone Formation Experiment Proved that TKD could Enhance the Effect of Gefitinib (1) The colorectal cancer cells HT29 (KRas wt) and HCT116 (KRas G13D) in the logarithmic growth phase were digested with pancreatin and then prepared into a single cell suspension, and the cells were evenly inoculated in a 12-well plate by 500 cells per well. Each of the colorectal cancer cells HT29 and HCT116 was divided into six groups, with three auxiliary wells in each group, and cultured in an incubator at 37° C. under 5% $CO_2$ for 24 hours to implement adhesion of the cells.
(2) After rinsing with PBS for three times, culture medium containing TKD and TKDm (which respectively had final concentrations of 0 μg/mL, 10 μg/mL and 20 μg/mL) and gefitinib were added respectively to continuously culture the cells for 24 hours (the solution with the concentration of 0 μM was prepared by the equal volume of dimethyl sulfoxide DMSO). Growth of the cells was observed every day. Cell culture solution was replaced every 1-2 days. The culture was stopped until cell clones (more than 50 cells were considered as one clone) were seen under a light microscope. In this experiment, in order to verify the effect of TKD on restoring the sensitivity of the colorectal cancer cells to gefitinib, the cells were all treated with low-concentration gefitinib, wherein the KRas wild-type cells HT29 was treated with 2 μM gefitinib, and the KRas mutant-type cells HCT116 was treated with 4 μM gefitinib.
(3) After the supernatant of each group was discarded, the cells were washed twice with the PBS buffer solution, and dried in air. A proper amount of methanol stationary liquid was added into each well for cell fixation for 15 minutes, and residual stationary liquid in the well was washed off with PBS solution, and dried in air. A proper amount of crystal violet staining solution was added into each well for cell staining for 15 minutes, and residual staining solution in the well was washed off with PBS solution, and dried in air. The cell clones seen in the auxiliary wells of each group were counted under an inverted microscope and the number of the clones was calculated.
(4) Statistical analysis was carried out by using GraphPad Prism8 software, and one way anova was used to compare means of multiple groups. The difference was statistically significant when $P<0.05$.

Figure 26A:
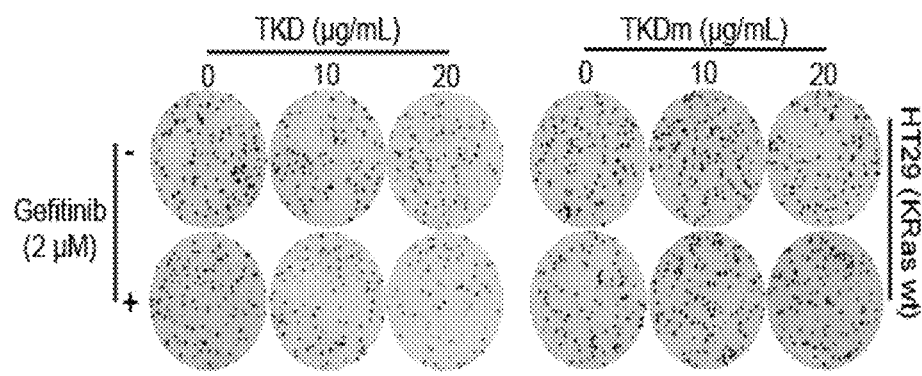
FIG. 26 is a graph showing the influence of the combination use of the TMD molecule and the gefitinib on the clone growth of HT29 (KRas wt), and the combination use of the TKDm molecule and the gefitinib on the clone growth of HT29 (KRas wt)
FIG. 26B is a graph showing the influence of the combination use of the TMD molecule and the gefitinib on the clone growth of HCT116 (KRas G13D), and the combination use of TKDm molecule and the gefitinib on the clone growth of HCT116 (KRas G13D).
Figure 26B:
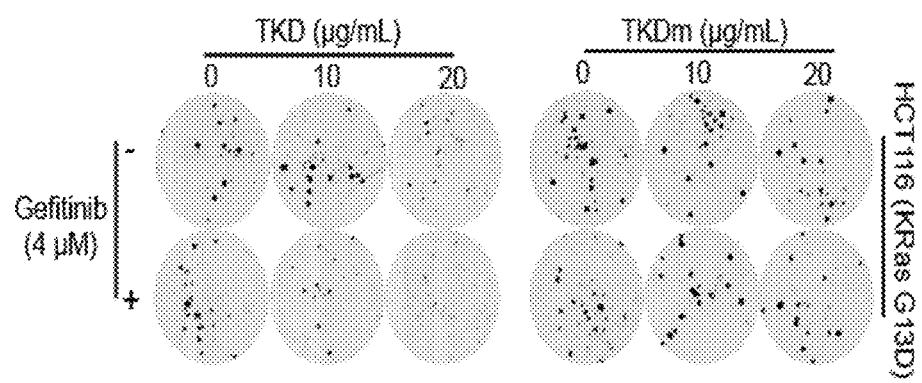
Figure 27A:
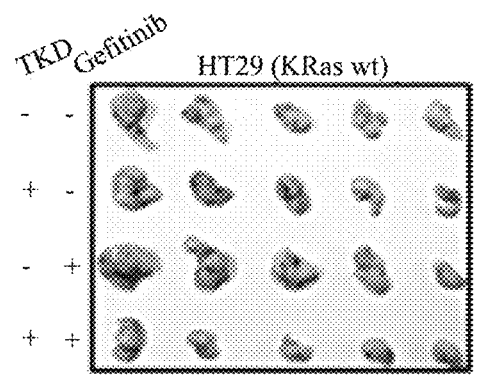
FIG. 27A is a pictorial diagram showing the influence of the combination use of the TKD and the gefitinib on the HT29 (KRas wt)-derived tumor.
Figure 27B:
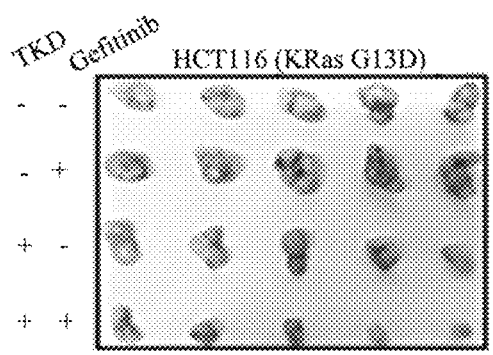
FIG. 27B is a pictorial diagram showing the influence of the combination use of the TKD and the gefitinib on the HCT116 (KRas G13D)-derived tumor.
Figure 27C:
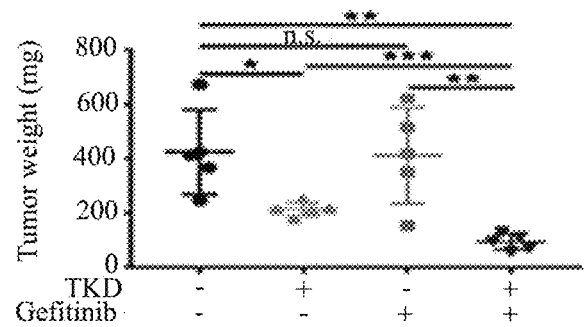
FIG. 27C is a statistical result graph showing thethe influence of the combination use of the TKD and the gefitinib on the HT29 (KRas wt)-derived tumor.
Figure 27D:
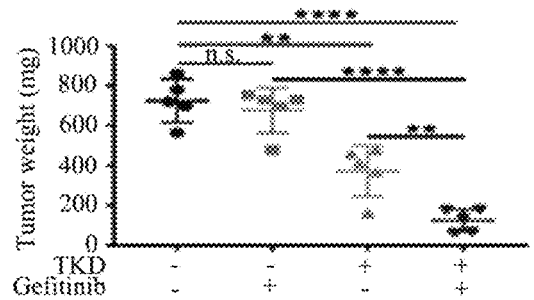
FIG. 27D is a statistical result graph showing the the influence of the combination use of the TKD and the gefitinib on the HCT116 (KRas G13D)-derived tumor, wherein **represents that $P<0.0001$; *represents that $P<0.001$; **represents that $P<0.01$; *represents that $P<0.05$; and ns represents that there is no significant difference.

Results were shown in FIG. 26A and FIG. 26B. The clone formation experiment proved that combination of TKD and gefitinib could significantly inhibit the growth of HT29 (KRas wt) and HCT116 (KRas G13D), and the effect was better than that of any drug alone.

3. The In-Vivo Tumor Formation Experiment Proved that TKD could Enhance the Effect of Gefitinib (1) Balb/c nude mice, female, 4 weeks to 5 weeks old, purchased from Guangdong Laboratory Animal Center and raised in Laboratory Animal Center of Sun Yat-sen University, were used in this experiment. The experimental mice were divided into four groups, with five mice in each group, which were respectively a phosphate buffer solution (PBS) control group, a gefitinib group, a TKD group (25 mg/kg), and a combination group of gefitinib (25 mg/kg) and TKD (25 mg/kg). In order to better demonstrate the effect of the combination of TKD and gefitinib, the mice were all treated with low-concentration TKD and gefitinib in the experiment.
(2) The HT29 and HCT116 cells in the logarithmic phase were digested with pancreatin, the digestion was stopped with the complete culture solution, and then the cells were counted. After counting, 10 million HT29 and HCT116 cells were taken respectively, washed twice with PBS, centrifuged at 300 g for 5 minutes after finishing each washing, and collected.
(3) The cell dilution buffer solution having the composition of PBS: matrix glue (Corning Company)=1: 1 was prepared to resuspend the cells. Then, the HT29 and HCT116 cells were resuspended with 1 mL of buffer solution respectively, and put on ice for later use.
(4) The subcutaneous tumor formation experiment was carried out: each mouse was anesthetized by intraperitoneal injection of 150 μL of tribromoethanol, and then 100 μL (500,000 cells) of HT29 cell suspension and 100 μL (500,000 cells) of HCT116 cell suspension were injected subcutaneously into left and right sides of back of the mouse respectively, wherein the HT29 cells were injected into the left side and the HCT116 cells were injected into the right side.
(5) After the mice were raised for one week, the administration experiment was started: administration modes of PBS and gefitinib were injection and intragastric administration, and the administration mode of TKD was intraperitoneal injection. The administration volume was 150 μL. The administration frequency was once every three days at a fixed time, and the administration was continued for seven times.
(6) After the administration, each mouse was injected with 150 μL of tribromoethanol, and then killed by cervical dislocation. Tumors on the left and right sides of the mouse were respectively collected and weighed to calculate weights of tumors. Experimental results were shown in FIG. 27A, FIG. 27B, FIG. 27C and FIG. 27D. The combination group of TKD and gefitinib could significantly inhibit the growth of the KRas wild-type (HT29) and KRas mutant-type (HCT116) colorectal cancers, and the inhibition effect was better than that of the PBS control group and that of the gefitinib group and that of the TKD group and.

The above data indicated that the combination of TKD and gefitinib could significantly inhibit the proliferation of the KRas wild-type and mutant-type colorectal cancer cells in a cell level and an animal level, and the effect was better than that of using the two drugs separately. Especially, in gefitinib-resistant KRas mutant cells, the combination of TKD and gefitinib could significantly enhance the effect of the colorectal cancer cells on gefitinib. Therefore, it was proved that TKD could restore the sensitivity of the cancer cells resistant to the EGFR-targeted drug by targeted degradation of KRas, which could be of great significance for expanding an application range of existing anti-cancer targeted drugs.

The above embodiments are the preferred embodiments of the present disclosure, but the embodiments of the present disclosure are not limited by the above embodiments. Any other changes, modifications, substitutions, combinations, and simplifications made without departing from the spirit and principle of the present disclosure should be equivalent substitute modes, and should be included in the scope of protection of the present disclosure.

The invention claimed is:

1. A fusion protein, comprising an anti-KRas protein nanobody, a ganglioside binding peptide and a lysosome recognition peptide; and wherein the amino acid sequence of the anti-KRas protein nanobody comprises:

(SEQ ID NO: 1)
DVQLQESGGGLVQAGGSLRLSCVASGRTFSTYPTGWFRQA

PGKEREFVARINLSGGITNYADSVKGRFTISRDNAKNTVY

LQMNSLKPEDTAVYYCGGGSTTWAGGIPTNFDYWGQGTQV

TVSSGR;

wherein the amino acid sequence of the ganglioside binding peptide comprises:

(SEQ ID NO: 2)
RAGLQFPVGRLLRRLLR;

and wherein the amino acid sequence of the lysosome recognition peptide comprises:

(SEQ ID NO: 3)
KFERQKILDQRFFE.

2. A nucleic acid molecule encoding the fusion protein according to claim 1.

3. A vector, comprising the nucleic acid molecule according to claim 2.

4. A host cell, comprising the vector according to claim 3.

5. A preparation method of the fusion protein according to claim 1, comprising the step of: culturing the host cell according to claim 4 to obtain the fusion protein.

6. A drug, comprising the fusion protein according to claim 1 and a pharmaceutically acceptable excipient.

7. A combination drug, comprising a fusion protein and an epidermal growth factor receptor (EGFR)-targeted drug, wherein the fusion protein comprises an anti-KRas protein nanobody, a ganglioside binding peptide and a lysosome recognition peptide; and wherein the amino acid sequence of the anti-KRas protein nanobody comprises:

```
                                        (SEQ ID NO: 1)
DVQLQESGGGLVQAGGSLRLSCVASGRTFSTYPTGWFRQA

PGKEREFVARINLSGGITNYADSVKGRFTISRDNAKNTVY

LQMNSLKPEDTAVYYCGGGSTTWAGGIPTNFDYWGQGTQV

TVSSGR;
``` wherein the amino acid sequence of the ganglioside binding peptide comprises:
RAGLQFPVGRLLRRLLR (SEQ ID NO: 2); and
wherein the amino acid sequence of the lysosome recognition peptide comprises:
KFERQKILDORFFE (SEQ ID NO: 3).

8. The host cell according to claim 4, wherein the host cell is selected from the group consisting of prokaryotic cell and eukaryotic cell.

9. The drug according to claim 6, wherein the drug is any one selected from the group consisting of a preparation for degrading a KRas protein, an anti-tumor drug, and a drug for improving a sensitivity of a KRas mutant-type colorectal cancer to a tumor-targeted drug.

10. The drug according to claim 9, the KRas protein is selected from wild-type KRas protein or mutant-type KRas protein.

11. The drug according to claim 10, the mutant-type KRas protein is the KRas protein mutated at one or more amino acid positions of G12, G13, S17, P34, A59, Q61 and A146.

12. The drug according to claim 9, wherein the KRas mutant-type tumor is a tumor related to a mutant-type KRas protein.

13. The drug according to claim 9, wherein the tumor-targeted drug is a human epidermal growth factor receptor (EGFR)-targeted drug.

14. The drug according to claim 13, wherein the tumor-targeted drug is gefitinib.

15. A method for treating or ameliorating colorectal cancer, comprising administering to a subject in need thereof an effective amount of the fusion protein according to claim 1 and gefitinib.

* * * * *